US007940421B2

(12) United States Patent
Takaki

(10) Patent No.: US 7,940,421 B2
(45) Date of Patent: May 10, 2011

(54) COLOR IMAGE FORMING APPARATUS

(75) Inventor: Kouichi Takaki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 895 days.

(21) Appl. No.: 11/283,695

(22) Filed: Nov. 22, 2005

(65) Prior Publication Data

US 2006/0187474 A1 Aug. 24, 2006

(30) Foreign Application Priority Data

Feb. 18, 2005 (JP) ................................ 2005-043130

(51) Int. Cl.

| | |
|---|---|
| ***H04N 1/60*** | (2006.01) |
| ***H04N 1/54*** | (2006.01) |
| ***H04N 1/56*** | (2006.01) |
| ***G03G 15/01*** | (2006.01) |
| ***G03G 15/04*** | (2006.01) |
| ***G03G 15/23*** | (2006.01) |
| ***G03G 15/24*** | (2006.01) |
| ***B41J 2/47*** | (2006.01) |
| ***B41J 2/455*** | (2006.01) |

(52) U.S. Cl. ......... 358/1.9; 358/523; 358/524; 358/530; 399/130; 399/168; 399/169; 399/178; 399/306; 399/309; 347/232; 347/233; 347/235; 347/237; 347/247; 347/249; 347/250

(58) Field of Classification Search .................. 358/1.9, 358/523, 524, 530; 399/130, 168, 169, 178, 399/306, 309; 347/225–250
See application file for complete search history.

(56) References Cited

U.S. PATENT DOCUMENTS 4,745,490 A * 5/1988 Shimizu et al. ............... 358/300
4,885,596 A * 12/1989 Egawa et al. ................. 347/111
4,903,067 A * 2/1990 Murayama et al. ........... 347/129
4,912,491 A * 3/1990 Hoshino et al. ............... 347/116
4,930,087 A * 5/1990 Egawa et al. ................ 358/1.14
(Continued)

FOREIGN PATENT DOCUMENTS

JP 9-292583 11/1997
(Continued)

OTHER PUBLICATIONS

European Search Report dated May 16, 2006 (EP 05 25 7277) (3 pages).

(Continued)

*Primary Examiner* — Edward L Coles
*Assistant Examiner* — Beniyam Menberu
(74) *Attorney, Agent, or Firm* — Finnegan, Henderson, Farabow, Garrett & Dunner, L.L.P.

(57) ABSTRACT

A tandem type color image forming apparatus, which can continuously form color images each containing two or more colors, including: a signal creating section having, for each color, two or more image area setting counters for generating an image valid area signal to set a starting position and a width of an image formation area in a sub-scanning direction; and a control section for executing color image formation control on a predetermined face of paper, based on an image top signal for controlling writing of an image on an image carrier and the image valid area signal for each color, wherein the control section sets each of the outputs of the image area setting counters independently according to a preset image formation mode, and selects and controls one of the image area setting counters for each image formation of each color.

5 Claims, 7 Drawing Sheets

U.S. PATENT DOCUMENTS

| | | | | | |
|---|---|---|---|---|---|
| 5,099,260 | A * | 3/1992 | Sato et al. | 347/116 |
| 5,309,182 | A * | 5/1994 | Mama et al. | 347/117 |
| 5,519,500 | A * | 5/1996 | Kumamoto | 358/296 |
| 5,764,378 | A * | 6/1998 | Oda et al. | 358/448 |
| 5,821,978 | A * | 10/1998 | Yamamoto et al. | 347/235 |
| 5,992,318 | A * | 11/1999 | DiBello et al. | 101/181 |
| 6,166,749 | A * | 12/2000 | Lee | 347/116 |
| 6,236,417 | B1 * | 5/2001 | Fujii et al. | 347/129 |
| 6,477,656 | B1 * | 11/2002 | Takaki et al. | 713/401 |
| 6,693,725 | B1 * | 2/2004 | Kanno | 358/1.9 |
| 6,898,385 | B2 * | 5/2005 | Ito et al. | 399/50 |
| 6,947,065 | B2 * | 9/2005 | Kaji | 347/116 |
| 7,224,481 | B2 * | 5/2007 | Tsuji | 358/1.16 |
| 7,528,853 | B2 * | 5/2009 | Ohmiya | 347/235 |
| 7,567,264 | B2 * | 7/2009 | Izumiya | 347/116 |
| 2001/0024296 | A1 | 9/2001 | Sugiyama | |
| 2002/0163671 | A1 * | 11/2002 | Takaragi | 358/3.28 |
| 2003/0007054 | A1 * | 1/2003 | Namiki et al. | 347/101 |
| 2003/0112317 | A1 * | 6/2003 | Murakami | 347/116 |
| 2003/0174200 | A1 * | 9/2003 | Izumiya et al. | 347/249 |
| 2004/0085439 | A1 * | 5/2004 | Takaki | 347/247 |
| 2004/0160506 | A1 | 8/2004 | Maeda | |
| 2004/0165058 | A1 * | 8/2004 | Nakatsu | 347/252 |
| 2005/0264646 | A1 * | 12/2005 | Izumiya et al. | 347/243 |

FOREIGN PATENT DOCUMENTS

| | | |
|---|---|---|
| JP | 11-143163 | 5/1999 |
| JP | 2002-29094 | 1/2002 |
| JP | 2003-262991 | 9/2003 |
| JP | 2004-009349 | 1/2004 |
| JP | 2004009349 | 1/2004 |
| JP | 2004-082626 | 3/2004 |

OTHER PUBLICATIONS

Japanese Office Action from Patent Application No. 2005-043130 dated Oct. 28, 2008.

* cited by examiner

COLOR IMAGE FORMING APPARATUS

CROSS REFERENCE TO RELATED APPLICATION

The present application is based on Japanese Patent Application No. 2005-043130 filed with Japan Patent Office on Feb. 18, 2005.

BACKGROUND OF THE INVENTION

1. Field of the Invention

The present invention relates to a color image forming apparatus preferably applied to a tandem type color printer, a copying machine or to a combination machine thereof provided with an intermediate transfer belt and a plurality of photoconductor drums.

2. Background Technology

In recent years, a tandem type color printer and a copying machine as well as the combination thereof have come into frequent use. The image forming apparatus of this type is provided with an exposure section, a development apparatus, a photoconductor drum, an intermediate transfer belt and a fixing apparatus for each color of the yellow (Y), magenta (M), cyan (C) and black (BK).

For example, in the Y-color exposure section, a light beam scanning is applied by a polygon mirror based on the color image information, and an electrostatic latent image is formed on a photoconductor drum. In the development apparatus, a Y-color toner member is attached to the electrostatic latent image formed on the photoconductor drum, whereby a color toner image is formed. The photoconductor drum allows the toner image to be transferred onto the intermediate transfer belt. The same procedure is applied to other M, C and BK colors. The color toner image transferred onto the intermediate transfer belt is fixed by the fixing apparatus after having been transferred onto paper.

The control system for forming a color image on a predetermined sheet of paper is provided with a signal creating section and control section. The signal creating section generates an image valid area signal for setting the start position and width of an image forming area in the sub-scanning direction for each color. The sub-scanning direction here refers to the direction orthogonal to the main scanning direction in which a light beam is applied through a polygon mirror. The control section provides color imaging control on a predetermined side of paper, based on the image top signal for controlling the writing of an image on the photoconductor drums, the image valid area signal for each color created by the signal creating section, and the main scanning direction reference signal (hereinafter referred to as "index signal") for the rotation speed control and face phase control of the polygon mirror.

The reference index signal corresponds to the horizontal sync signal for regulating the writing of an image in the horizontal direction of paper (main scanning direction). The image valid area signal corresponds to the vertical sync signal for regulating the writing of an image in the vertical direction of paper (sub-scanning direction). The image valid area signal is created based on the reference index signal. For example, a counter is provided for each color to count the pulse of the reference index signal in such a way that the image valid area signal will be outputted.

Japanese Unexamined Laid-Open Patent Publication No. 11-143163 (hereinafter referred as Patent Document 1) discloses a color printer, with reference to the color image forming apparatus. In the color printer of this Patent Document 1, the horizontal sync signal is outputted while the vertical sync signal for printing on the first page of paper is outputted, and video data is outputted in response to this horizontal sync signal. This color printer contains a counter for each of Y, M, C and BK colors. Using the software counter function, the CPU generates data in units of several bits for selecting the vertical sync signal, and the selection signal obtained by decoding this selection data is outputted to the counter for each color.

In response to the BK-color horizontal sync signal, the counter for BK color counts the selection signal and outputs the BK-color vertical sync signal. In response to the Y-color horizontal sync signal, the counter for Y color counts the selection signal and outputs the Y-color vertical sync signal. In response to the M-color horizontal sync signal, the counter for M color counts the selection signal and outputs the M-color vertical sync signal. In response to the C-color horizontal sync signal, the counter for C color counts the selection signal and outputs the C-color vertical sync signal.

As described above, a single counter is provided for each color, and software counter allows printing to be performed in all colors. This arrangement minimizes possible increase of the apparatus costs, and ensures higher printing speed.

Japanese Unexamined Laid-Open Patent Publication No. 2004-009349 (hereinafter referred as Patent Document 2) discloses an image forming apparatus for forming a multi-color image by superimposition of a plurality of single-color images. This image forming apparatus is a tandem apparatus capable of switching the printing mode, and is equipped with a scanning start signal generating section and an image formation timing generating section. For the colors used in common with both the all-color mode including all different colors and the subtractive color mode wherein colors are subtracted from those in the all-color mode, the scanning start signal generating section generates the scanning start signal of a light beam used in the subtractive color mode. The image formation timing generating section generates a timing signal for each color in each color mode, in response to the scanning start signal generated by the scanning start signal generating section.

In this case, the image formation timing generating section is equipped with a single clock counter. In response to the rise of the scanning start signal of the light beam used in the subtractive color mode, counting operation is reset. Then the video clock is inputted to start a new counting operation. The video clock is outputted to the comparator circuit for generating line sync signal for each of the BK, Y, M and C color. When such an image formation timing generating section has been arranged, the image write position of each color can be correctly controlled, and reduced production cost of the overall apparatus is ensured, even when a scanning start signal is generated by receiving light from the light source of one particular color.

A conventional tandem color image forming apparatus involves the following problems:

(i). The color printer disclosed in the Patent Document 1 contains one counter each of the Y, M, C and BK colors. When a certain job is given, this printer uses the software counter function of the CPU to output the vertical sync signal (image valid area signal) for the BK, Y, M and C colors from each counter.

When the next job is given, the image valid area signal is set for each color after the image top signal of that job has started up. Accordingly, the next image top signal does not rise until the counting operation of the final color terminates, and therefore, the image valid area signal for the next job cannot be set during the image formation of the final color.

This conventional arrangement depends heavily on software control, and makes it difficult to simplify the image writing unit structure and to reduce the CPU operation load. Not only that, this arrangement makes it difficult to increase the speed in color image formation.

(ii). When a color image is to be formed on the front and rear faces of paper, a single clock counter as shown in the Patent Document 2 is provided. The counting operation is reset and in response to the rise of the scanning start signal, and a new counting operation is started based on the video clock. When this function is employed, the counter source as a reference cannot be as desired. Accordingly, if the image formation size is reduced on the front and rear faces of paper, continuous image formation (smooth linear speed switching operation) on the front and rear faces will be difficult. This makes it difficult to increase the speed in color image formation, similarly to the case of the aforementioned (i).

SUMMARY OF THE INVENTION

To solve the aforementioned problems involved in the prior art, the object of the present invention is to provide a color image forming apparatus wherein an image valid area signal can be set for each color before the image top signal of the next job rises, and a simplified structure and reduced load of software control can be ensured.

An embodiment to solve the aforementioned problems is a tandem type color image forming apparatus wherein color images each composed of at least two or more colors can be formed on a continuous basis, this tandem type color image forming apparatus containing:

a signal creating section having, for each color, two or more image area setting counters for generating an image valid area signal for setting the start position and width of the image formation area in the sub-scanning direction; and a control section for providing color image formation control on a predetermined side of paper, based on an image top signal for controlling writing of an image on an image carrier and the image valid area signal for each color created by a signal creating section;

wherein this control section sets each of the outputs of the aforementioned image area setting counter independently according to the preset image formation mode, and selects and controls the image area setting counter for each formation of the image of each color.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

The following describes the color image forming apparatus as an embodiment of the present invention with reference to drawings.

Figure 1:
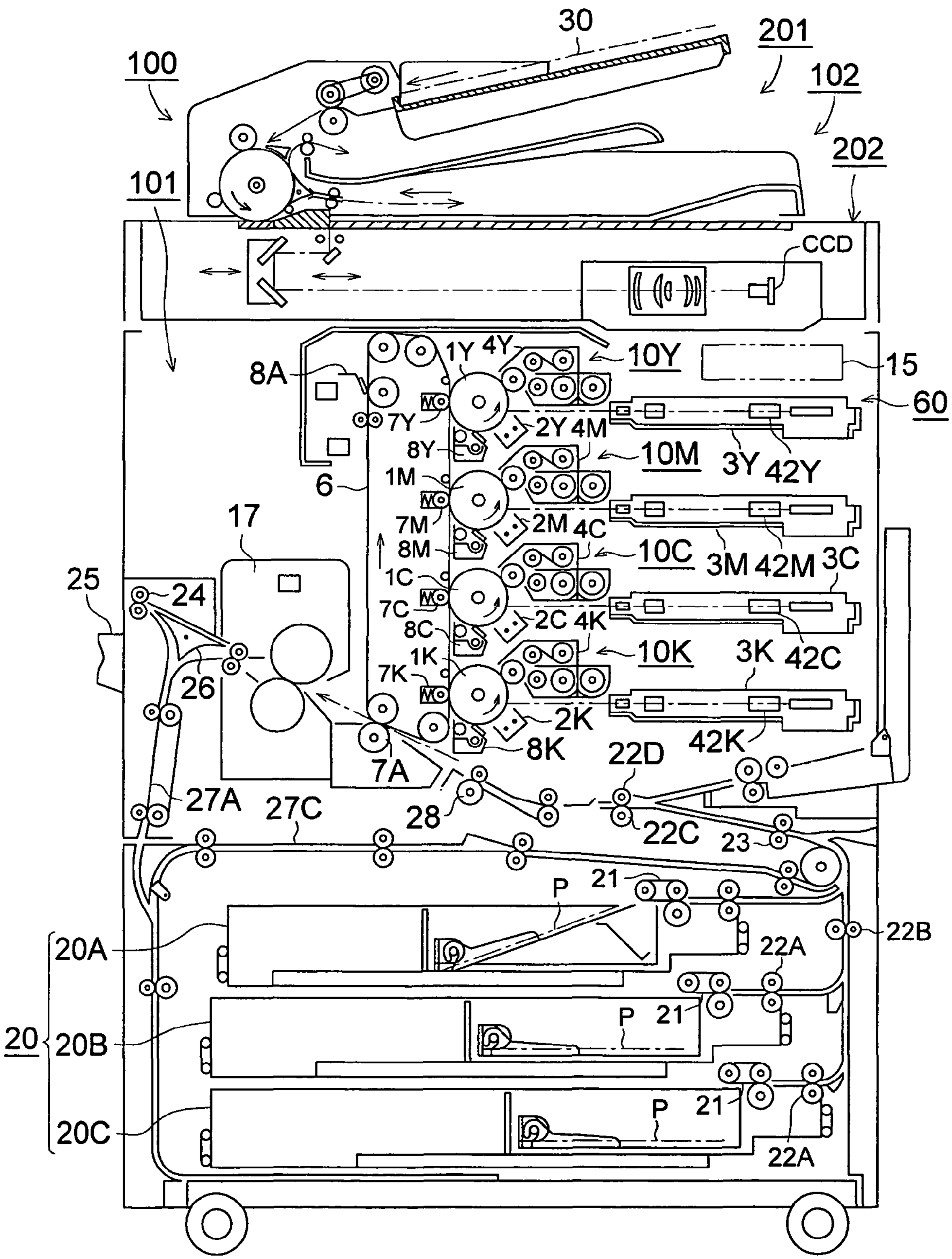
FIG. 1 is a schematic diagram representing an example of the configuration of the color copying machine 100 as an embodiment of the present invention.

FIG. 1 is a schematic diagram representing an example of the configuration of the color copying machine 100 as an embodiment of the present invention. The color copying machine 100 shown in FIG. 1 is only an example of the color image forming apparatus, equipped with a function of forming a color image on both sides of a predetermined sheet of paper. The color image forming apparatus can be applied to a tandem type color printer, a facsimile machine or a composite machine thereof, in addition to the color copying machine 100.

The color copying machine 100 is composed of a copying machine main body 101 and an image reading apparatus 102. An automatic document feed apparatus 201 and a document image scanning/exposure apparatus 202 are mounted on the top of the copying machine main body 101. The document 30 placed on the document platen of the automatic document feed apparatus 201 is fed by a conveyance section (not illustrated). The image on one side or both sides of the document is scanned and exposed by the optical system of the document image scanning/exposure apparatus 202. The incident light reflected from the document image is read by the line image sensor CCD.

The analog image signal subjected to photoelectric conversion by the line image sensor CCD is subjected to analog processing, analog-to-digital conversion, shading correction and image compression by the image processing section (not illustrated), and is formed into digital image information. Image information is sent to the image writing units 3Y, 3M, 3C and 3K constituting the image forming section.

The aforementioned automatic document feed apparatus 201 is provided with an automatic double-sided document conveyance mechanism. This automatic document feed apparatus 201 reads the contents of a plurality of documents 30 fed from the top of the document platen, continuously in one operation, and the documents are stored in a storage section (electronic RDH function). This electronic RDH function is conveniently used when a plurality of documents are copied by the copying function or when a plurality of documents 30 are sent by the facsimile function.

The copying machine main body 101 is called the tandem type color image forming apparatus. The image forming section is equipped with:

a plurality of sets of image forming sections 10Y, 10M, 10C and 10K each having an image carrier for each color;

an endless intermediate transfer belt 6;

a sheet feed/conveyance section including an automatic sheet re-feed mechanism (ADU mechanism);

a fixing apparatus 17 for fixing a toner image; and a paper feeding section 20 for feeding the transfer material (hereinafter referred to as "paper") P to the image forming system.

The paper feeding section 20 is arranged below the image forming system. The paper feeding section 20 is composed of three sheet feed trays 20A, 20B and 20C, for example. The paper P fed out from the sheet feed trays 20A, 20B and 20C is conveyed below image forming section 10K through conveyance rollers 22A, 22B and 22C.

The image forming sections 10Y, 10M, 10C and 10K constitute an image forming section 60, and each have a polygon mirror and photoconductor drum for each color. Further, they form a color image on predetermined paper P, based on the main scanning reference signal (hereinafter referred to as "index signal") and pseudo main scanning reference signal (hereinafter referred to as "pseudo index signal").

In this example, the image forming section 10Y includes a polygon mirror 42Y, a photoconductor drum 1Y, a charging device 2Y, an image writing unit 3Y, a development unit 4Y and a cleaning section 8Y for image formation. For example; the photoconductor drum 1Y is arranged rotatably close to the right top of the intermediate transfer belt 6 so that a Y-color toner image is formed.

The photoconductor drum 1Y is turned in the counterclockwise direction by a drive mechanism (not illustrated). The charging device 2Y is arranged to the oblique lower right of the photoconductor drum 1Y so that the surface of the photoconductor drum 1Y is charged to a predetermined potential level. The image writing unit 3Y is arranged approximately just beside the photoconductor drum 1Y so as to stand opposite each other. A Y-color light beam of a predetermined intensity based on Y-color image data is applied to the photoconductor drum 1Y charged in advance. This light beam is deflected by the rotating Y-color polygon mirror 42Y, and applied to the dram 1Y. This process is what is called the writing of Y-color image data in the main scanning direction.

The main scanning direction corresponds to the direction parallel to the rotary axis of the photoconductor drum 1Y. The photoconductor drum 1Y turns in the sub-scanning direction. The sub-scanning direction denotes the direction orthogonal to the rotary axis of the photoconductor drum 1Y. A Y-color electrostatic latent image is formed on the photoconductor drum 1Y by turning of this photoconductor drum 1Y in the sub-scanning direction and the deflection and application of the light beam in the main scanning direction.

The development unit 4Y is arranged above the image writing unit 3Y. It operates in such a way that the Y-color electrostatic latent image formed on the photoconductor drum 1Y will be developed. The development unit 4Y has a Y-color development roller (not illustrated). The development unit 4Y accommodates the Y-color toner and carrier. The Y-color development roller incorporates a magnet, and feeds the two-component developer obtained by agitating the carrier and Y-color toner inside the development unit 4Y, by rotation, to the site opposite to the photoconductor drum 1Y so that the an electrostatic latent image will be developed by Y-color toner. The Y-color toner image formed on the photoconductor drum 1Y operates the primary transfer roller 7Y to allow the image to be transferred onto the intermediate transfer belt 6 (primary transfer). A cleaning section 8Y is arranged on the lower left side of the photoconductor drum 1Y, and toner remaining on the photoconductor drum 1Y as a result of the previous transfer operation is removed (cleaned).

In this example, the image forming section 10M is arranged below the image forming section 10Y. The image forming section 10M includes a polygon mirror 42M, a photoconductor drum 1M, a charging device 2M, an image writing unit 3M, a development unit 4M and a cleaning section 8M for image formation. For example, the photoconductor drum 1M is arranged rotatably, below the aforementioned photoconductor drum 1Y, close to the right side of the intermediate transfer belt 6 so that a M (magenta)-color toner image is formed. The photoconductor drum 1M is turned in the counterclockwise direction by the drive mechanism (not illustrated). The charging device 2M is arranged to the oblique lower right of the photoconductor drum 1M so that the surface of the photoconductor drum 1M is charged to a predetermined potential level.

The image writing unit 3M is arranged approximately just beside the photoconductor drum 1M so as to stand opposite each other. A M-color light beam of a predetermined intensity based on M-color image data is applied to the photoconductor drum 1M charged in advance. This light beam is deflected by the rotating M-color polygon mirror, and is and applied to the dram 1M, whereby M-color image data is written. An M-color electrostatic latent image is formed on the photoconductor drum 1M by turning of this photoconductor drum 1M in the sub-scanning direction and the deflection and application of the light beam in the main scanning direction.

The development unit 4M is arranged above the image writing unit 3M. It operates in such a way that the M-color electrostatic latent image formed on the photoconductor drum 1M will be developed. The development unit 4M has a M-color development roller (not illustrated). The development unit 4M accommodates the M-color toner and carrier. The M-color development roller incorporates a magnet, and feeds the two-component developer obtained by agitating the carrier and M-color toner inside the development unit 4M, by rotation, to the site opposite to the photoconductor drum 1M so that the an electrostatic latent image will be developed by M-color toner. The M-color toner image formed on the photoconductor drum 1M operates the primary transfer roller 7M to allow the image to be transferred onto the intermediate transfer belt 6 (primary transfer). A cleaning section 8M is arranged on the lower left side of the photoconductor drum 1M, and toner remaining on the photoconductor drum 1M as a result of the previous transfer operation is removed (cleaned).

In this example, the image forming section 10C is arranged below the image forming section 10M. The image forming section 10C includes a polygon mirror 42C, a photoconductor drum 1C, a charging device 2C, an image writing unit 3C, a development unit 4C and a cleaning section 8C for image formation. For example, the photoconductor drum 1C is arranged rotatably, below the aforementioned photoconductor drum 1M, close to the right side of the intermediate transfer belt 6 so that a C (cyan)-color toner image is formed. The photoconductor drum 1C is turned in the counterclockwise direction by the drive mechanism (not illustrated). The charging device 2C is arranged obliquely to the lower right of the photoconductor drum 1C so that the surface of the photoconductor drum 1C is charged to a predetermined potential level.

The image writing unit 3C is arranged approximately just beside the photoconductor drum 1C so as to stand opposite each other. A C-color light beam of a predetermined intensity based on C-color image data is applied to the photoconductor drum 1C charged in advance. This light beam is deflected by the rotating C-color polygon mirror, and applied to the dram 1C, whereby C-color image data is written. A C-color electrostatic latent image is formed on the photoconductor drum 1C by turning of this photoconductor drum 1C in the sub-scanning direction and the deflection and application of the light beam in the main scanning direction.

The development unit 4C is arranged above the image writing unit 3C. It operates in such a way that the C-color electrostatic latent image formed on the photoconductor drum 1C will be developed. The development unit 4C has a C-color development roller (not illustrated). The development unit 4C accommodates the C-color toner and carrier. The C-color development roller incorporates a magnet, and feeds the two-component developer obtained by agitating the carrier and C-color toner inside the development unit 4C, by rotation, to the site opposite to the photoconductor drum 1C so that the an electrostatic latent image will be developed by C-color toner. The C-color toner image formed on the photoconductor drum 1C operates the primary transfer roller 7C to allow the image to be transferred onto the intermediate transfer belt 6 (primary transfer). A cleaning section 8C is arranged on the lower left side of the photoconductor drum 1C, and toner remaining on the photoconductor drum 1C as a result of the previous transfer operation is removed (cleaned).

In this example, the image forming section 10K is arranged below the image forming section 10C. The image forming section 10K includes a polygon mirror 42K, a photoconductor drum 1K, a charging device 2K, an image writing unit 3K, a development unit 4K and a cleaning section 8K for image formation. For example, the photoconductor drum 1K is arranged rotatably, below the aforementioned photoconductor drum 1C, close to the right side of the intermediate transfer belt 6 so that a BK (black)-color toner image is formed. The photoconductor drum 1K is turned in the counterclockwise direction by the drive mechanism (not illustrated). The charging device 2K is arranged to the oblique lower right of the photoconductor drum 1K so that the surface of the photoconductor drum 1K is charged to a predetermined potential level.

The image writing unit 3K is arranged approximately just beside the photoconductor drum 1K so as to stand opposite each other. A BK-color light beam of a predetermined intensity based on BK-color image data is applied to the photoconductor drum 1K charged in advance. This light beam deflected by the rotating BK-color polygon mirror, and is applied to the dram 1K, whereby BK-color image data is written. An BK-color electrostatic latent image is formed on the photoconductor drum 1K by turning of this photoconductor drum 1K in the sub-scanning direction and the deflection and application of the light beam in the main scanning direction.

The development unit 4K is arranged above the image writing unit 3K. It operates in such a way that the BK-color electrostatic latent image formed on the photoconductor drum 1K will be developed. The development unit 4K has a BK-color development roller (not illustrated). The development unit 4K accommodates the BK-color toner and carrier. The BK-color development roller incorporates a magnet, and feeds the two-component developer obtained by agitating the carrier and BK-color toner inside the development unit 4K, by rotation, to the site opposite to the photoconductor drum 1K so that the an electrostatic latent image will be developed by BK-color toner. The BK-color toner image formed on the photoconductor drum 1K operates the primary transfer roller 7K to allow the image to be transferred onto the intermediate transfer belt 6 (primary transfer). A cleaning section 8K is arranged on the lower left side of the photoconductor drum 1K, and toner remaining on the photoconductor drum 1K as a result of the previous transfer operation is removed (cleaned).

Organic Photo Conductor (OPC) drums are used as the photoconductor drums 1Y, 1M, 1C, and 1K. Scorotron chargers are used as the charging devices 2Y, 2M, 2C and 2K, and direct current voltage in units of a few hundred volts is applied thereto. The primary transfer bias voltage having the polarity (positive in the present embodiment) opposite to that of the toner to be used is applied to the primary transfer roller 7Y, 7M, 7C and 7K.

The intermediate transfer belt 6 is an example of the image carrier. The toner images transferred by the primary transfer roller 7Y, 7M, 7C and 7K are superimposed to form a color toner image (color image). The color image formed on the intermediate transfer belt 6 is conveyed toward the secondary transfer roller 7A by the rotation of the intermediate transfer belt 6 in the clockwise direction. The secondary transfer roller 7A is located below the intermediate transfer belt 6, and operates in such a way that the color toner image formed on the intermediate transfer belt 6 will be transferred onto the paper P conveyed from the paper feeding section 20 (second transfer).

The fixing apparatus 17 is arranged on the left side of the secondary transfer roller 7A, and operates to applies the process of fixing to the paper with the color image transferred thereon. The fixing apparatus 17 is provided with a fixing roller, a pressure roller and a heat roller. In the process of fixing, heat and pressure is applied to the paper when the paper passes between the fixing roller heated by the heat roller, and the pressure roller. The paper having been subjected to the process of fixing is sandwiched between paper ejection rollers 24 and is placed on the ejection tray 25 outside the apparatus.

In this example, a cleaning section 8A is arranged on the upper left of the intermediate transfer belt 6. It operates to remove the toner remaining on the intermediate transfer belt 6, after transfer. The cleaning section 8A has a pad for removing the electric charge eliminating section for eliminating electric charge from the intermediate transfer belt 6, and removing the toner remaining on the intermediate transfer belt 6. The belt surface is cleaned by the cleaning section 8A. After the electric charge has been eliminated from the intermediate transfer belt 6 by the electric charge eliminating section, the intermediate transfer belt 6 starts the next image forming cycle.

In the duplex image formation, the sheets of paper P, with an image formed on one side (front face), having been ejected from the fixing apparatus 17, are branched off by the branching section 26. The sheets of paper P passes through the circulating paper feed path 27A constituting each sheet feed/conveyance section, and their front and rear faces are reversed by the reverse/conveyance path 27B as a sheet re-feed mechanism (ADU mechanism). Passing through the re-feed/conveyance section 27C, the sheets of paper P merge on the sheet feed roller 22D. The paper P is conveyed again to the secondary transfer roller 7A through the registration rollers 23 and 28. Then color images (color toner images) are transferred onto on the other side (rear) of the sheets of paper P collectively in one operation.

The fixing apparatus 17 allow the process of fixing to be applied to paper P with the color image transferred thereon. Paper P is sandwiched between the paper ejection rollers 24 and is placed on the ejection tray 25 outside the apparatus. After the color image has been transferred onto the paper P by the secondary transfer roller 7A, the paper P is subjected to curvature-separation, and remaining toner is removed by the cleaning means 8A from the intermediate transfer belt 6.

The paper P used in these steps of image formation includes the thin paper of about 52.3 through 63.9 kg/$m^2$ (1,000 sheets), plain paper of 64.0 through 81.4 kg/$m^2$ (1000 sheets), heavy paper of 83.0 through 130.0 kg/$m^2$ (1,000 sheets), and extra-heavy paper of about 150.0 kg/$m^2$ (1,000 sheets). The thickness of paper P used is about 0.05 through 0.15 mm.

The copying machine main body 101 is provided with a control section 15. When an image is formed on both sides of predetermined paper, the control section 15 provides image formation control on the predetermined surfaces of paper P, based on the index signal and two or more pseudo index signals; wherein the cycle of the index signal is changed when the rotation speed of the polygon mirror 42Y is changed and the face phase is controlled, whereas the cycles of these pseudo index signals are fixed, in contrast to that of the index signal.

Figure 2:
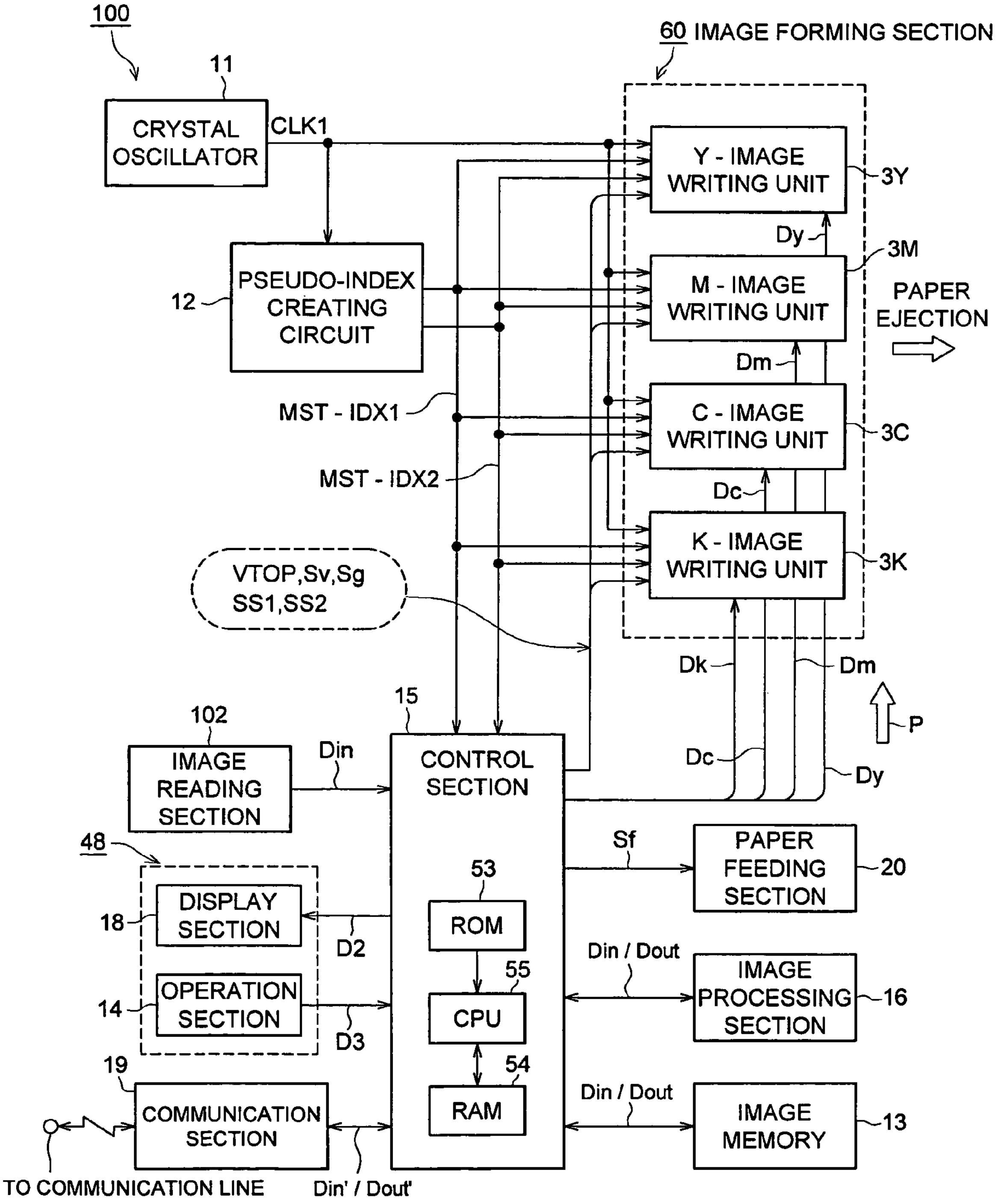
FIG. 2 is a block diagram representing an example of the configuration of the control system of the color copying machine 100.

FIG. 2 is a block diagram representing an example of the configuration of the control system of the color copying machine 100. The color copying machine 100 given in FIG. 2 provides color image formation control on the predetermined surface of paper P, according to two types of pseudo main scanning reference signals, for example. The color copying machine 100 includes a pseudo-index creating circuit 12, an image memory 13, a control section 15, an image processing section 16, a communication section 19, a paper feeding section 20, an operation panel 48, an image forming section 60 and an image reading apparatus 102. They are connected with the control section 15.

The control section 15 is equipped with a ROM (Read Only Memory) 53, a RAM (Random Access Memory) 54 for work, and a CPU (Central Processing Unit) 55. The ROM 53 stores the system program data for controlling the overall copying machine, and the data for controlling the rotation speed of a polygon mirror 42Y or others. The RAM 54 temporarily stores the control commands for execution of various types of modes.

When the CPU 55 is turned on, the system program data is read from the ROM 53 to start the system so as to control the overall copying machine. When the color image is formed on predetermined paper P, the CPU 55 provides color image formation control on the predetermined surface of paper P, based on the index signal (hereinafter referred to as "IDX signal") and pseudo index signal (hereinafter referred to as "MST-IDX signal"); wherein the cycle of the index signal is changed when the rotation speed and the face phase of the polygon mirror 42Y are controlled, whereas the cycle of these pseudo index signal can be set to the predetermined value, in contrast to the IDX signal. For example, based on two types of MST-IDX signals—MST-IDX1 and MST-IDX2—, the CPU 55 determines the image top signal (hereinafter referred to as "VTOP signal") in the step of processing the color image from the front face of paper P to the rear, and VTOP signal in the step of processing the color image when switching from tray 1 to tray 2.

The operation panel 48 is connected to the control section 15. It contains a operation section 14 composed of a touch panel (not illustrated), and a display section 18 composed of a liquid crystal display panel. The operation panel 48 uses an input section of GUI (Graphical User Interface) type. The power supply switch or the like is set in the operation panel 48. The display section 18 provides display operations, interlocked with the operation section 14, for example.

The operation panel 48 operates in such a way that the image formation mode is set by the CPU 55. The image formation mode includes at least thickness of paper, duplex image formation and image formation magnification. The operation section 14 is operated when selecting the type of paper P such as plain paper, recycled paper, coated paper and OHT paper, or choosing one of the sheet feed trays 20A through 20C for storing the paper P. The operation section 14 is also used to set the image formation conditions such as an image magnification rate and reduction rate. The information on image formation mode, image formation conditions and sheet feed tray selection set on the operation panel 48 is outputted to the CPU 55 in the form of operation data D3.

According to the operation data D3 outputted from the operation section 14, the control section 15 controls image formation on a predetermined surface of paper P. For example, the control section 15 adjusts the image size on the front and rear faces of the paper P and the positions of the front and rear faces of the paper P, in conformity to the preset type of paper P or preset sheet feed trays 20A through 20C.

Connected to the control section 15, the image reading apparatus 102 reads the image from the document 30 illustrated in FIG. 1, and outputs the digital color image data Din (R, G and B color component data) to the control section 15. The control means 15 stores the image data Din in the image memory 13. The image processing means 16 reads the image data Din from the image memory 13 and applies color conversion of R, G and B color component data into Y-color image data Dy, M-color image data Dm, C-color image data Dc and BK-color image data Dk. The image data Dy, Dm, Dc and Dk of Y, M, C and K colors subsequent to color conversion is stored in the image memory 13 or Y, M, C and K color image memory (not illustrated).

In this example, to reduce the operation load of the CPU 55, it is also possible to make such arrangements that the VTOP signal in the step of color image formation from the front to rear faces of paper P, and the VTOP signal in the step of processing the color image when switching from tray 1 to tray 2 are determined on the image processing section 16, based on the two types of MST-IDX signals—MST-IDX1 signal and MST-IDX2 signal.

Connected to a communication line such as LAN, the communication section 19 is used for communication with an external computer. When the color copying machine 100 is used as a printer, the communication section 19 receives print data Din from the external computer in the print operation mode. To drive the sheet feed trays 20A through 20C, the paper feeding section 20 is connected to a motor (not illustrated), and controls the motor rotation in response to the sheet feed control signal Sf, and conveys the paper P fed out of the sheet feed tray 20A, 20B or 20C, to the image formation system. The sheet feed control signal Sf is supplied to the paper feeding section 20 from the control means 15.

The image forming section 60 has image writing units 3Y, 3M, 3C and 3K for Y, M, C and BK colors. It inputs the Y, M, C and BK color image data Dy, Dm, Dc and Dk from the Y, M, C and BK color image memories, and operates in such a way that an image is formed on a predetermined surface of the paper P, based on the Y, M, C and BK color YIDX signal, MIDX signal, CIDX signal, KIDX signal, MST-IDX1 signal and MST-IDX2 signal. The image data Dy, Dm, Dc and Dk for Y, M, C and K colors contains the data received from an external computer.

The YIDX signal is a reference signal used to control the rotation speed and face phase of the Y-color polygon mirror 42Y and to apply laser beam to the photoconductor drum 1Y. The MIDX signal is a reference signal used to control the rotation speed and face phase of the M-color polygon mirror 42M and to apply laser beam to the photoconductor drum 1M. The CIDX signal is a reference signal used to control the rotation speed and face phase of the C-color polygon mirror 42C and to apply laser beam to the photoconductor drum 1C. The KIDX signal is a reference signal used to control the rotation speed and face phase of the BK-color polygon mirror 42K and to apply laser beam to the photoconductor drum 1K.

The pseudo-index creating circuit 12 is connected to the aforementioned control section 15. It generates the MST-IDX1 and MST-IDX2 signals whose cycles can be set to a predetermined value as required, in contrast to the IDX signal serving as a reference signal in the step of color image formation and the cycle is changed when the rotation speed of the polygon mirror 42Y is changed and the face phase is controlled.

In this example, the pseudo-index creating circuit 12 creates the first MST-IDX1 signal having the first cycle and the second MST-IDX2 signal having the second cycle shorter than the first one. This MST-IDX1 signal is used to apply the processing of paper front face image formation, and the MST-IDX2 signal is used to apply the processing of paper rear image formation. This allows the image sizes on the front and rear faces to be the same, despite possible shrinkage of paper P subsequent to image formation on the front face. When the sheet feed is changed from tray 1 to tray 2 to form a color image, the same image sizes can be ensured among different types of paper P, even if different types of paper P are placed in the trays 1 and 2.

In this example, when the pseudo-index creating circuit 12 creates the MST-IDX1 and MST-IDX2 signals, the CPU 55 determines the other side of the paper P1 or one side of the next paper P2 in response to the MST-IDX1 and MST-IDX2 signals. For example, the CPU 55 rises the image top signal (hereinafter referred to as "VTOP signal") on the rear face of the paper P1 and the VTOP signal on the front face of the paper P2 on the next page, in response to MST-IDX1 and MST-IDX2 signals, and the detection of the leading edge of the paper P.

When an image is formed on both sides of predetermined paper, the CPU 55 selects the MST-IDX1 and MST-IDX2 signals alternately and provides color formation control on a predetermined side of the paper P, in response to the MST-IDX1 or MST-IDX2 and IDX signal. For example, at the time of image formation in the image writing units 3Y, 3M, 3C and 3K, the CPU 55 selects the MST-IDX1 and MST-IDX2 signals alternately. After that, the CPU 55 detects the leading edge of paper P in response to the MST-IDX1 and MST-IDX2 signals, thereby generating the VTOP signal.

In this example, the pseudo-index creating circuit 12 is connected with the crystal oscillator 11, and creates the reference clock (hereinafter referred to as "CLK1 signal"). The CLK1 signal is outputted to each of the pseudo-index creating circuit 12 and the image writing units 3Y, 3M, 3C and 3K for Y, M, C and BK-color.

Figure 3:
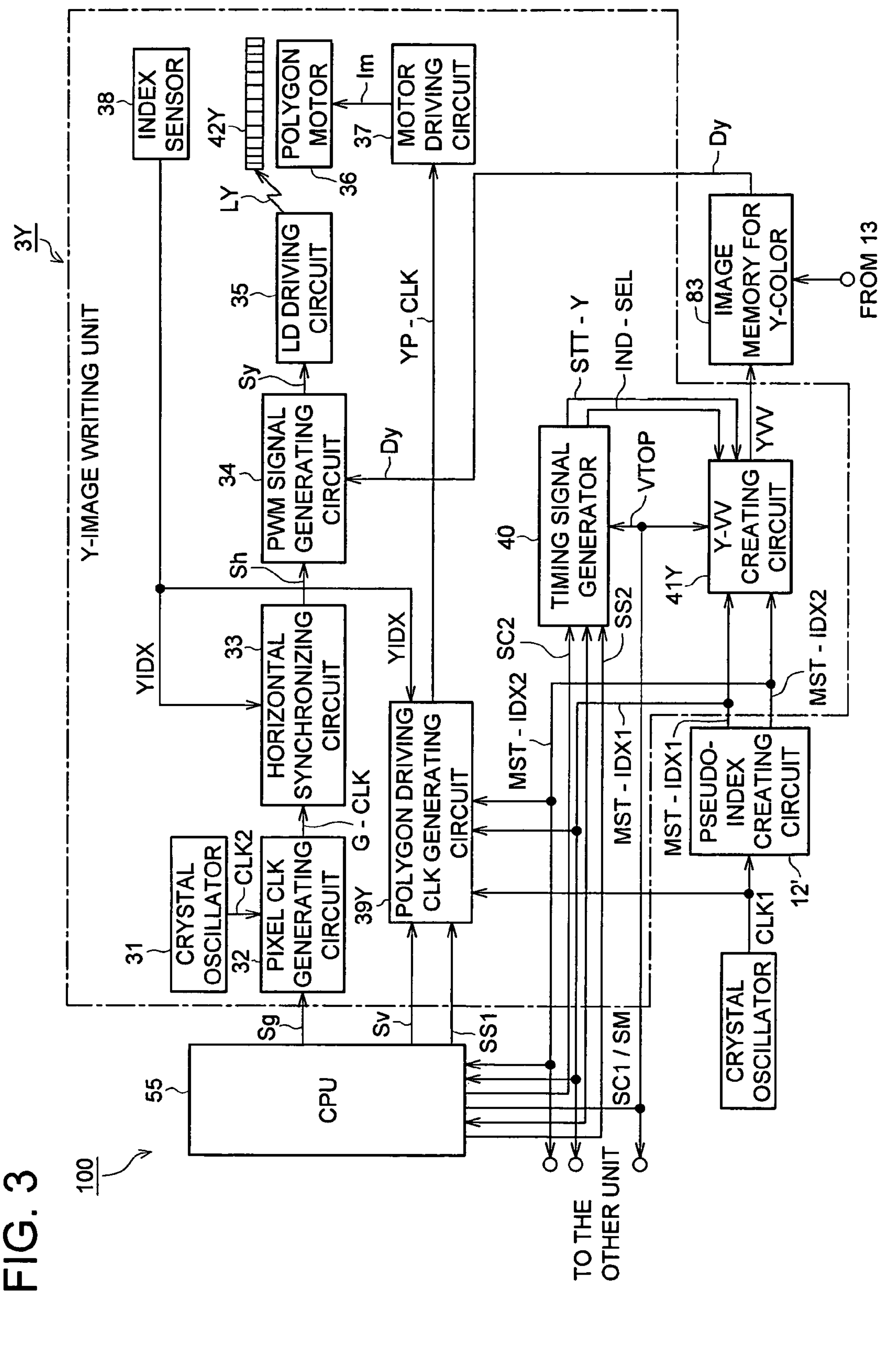
FIG. 3 is a block diagram representing an example of the configuration of a Y-image writing unit 3Y shown in FIG. 2 and the peripheral circuit thereof.

FIG. 3 is a block diagram representing an example of the configuration of a Y-image writing unit 3Y shown in FIG. 2 and the peripheral circuit thereof. The Y-color image writing unit 3Y shown in FIG. 3 is connected to the crystal oscillator 11, pseudo-index creating circuit 12 and CPU 55.

The CPU 55 executes color image formation processing on the predetermined side of the paper P in response to:

the VTOP signal for controlling the writing of an image on the photoconductor drum 1Y shown in FIG. 1;

the Y-color image valid area signal (V-valid signal, hereinafter referred to as "YVV signal") created by the Y-color image valid area signal creating circuit (hereinafter referred to as "Y-VV creating circuit 41Y"); and the MST-IDX1 or MST-IDX2 signal for controlling the rotation speed and face phase of the polygon mirror 42Y.

Connected with the pseudo index forming circuit 12, the CPU 55 operates so as to create the MST-IDX1 and MST-IDX2 signals, in response to the CLK1 signal for creating the Y-color polygon drive clock signal (hereinafter referred to as "YP-CLK signal). The CLK1 signal is outputted to the pseudo-index creating circuit 12 and polygon driving CLK generating circuit 39 from the crystal oscillator 11. In this case, assume that the YP-CLK (polygon drive clock) signal has a cycle of Tp, and the scanning period of the polygon mirror 42Y is Ti. Further, assume that n and m denotes natural numbers. Then the relationship between the one cycle of the polygon drive CLK signal and that of the MST-IDX1 and MST-IDX2 signals is set to the equation, $Tp \times n = Ti \times m$ (wherein n is equal to or smaller than m). The pseudo-index creating circuit 12 allows the CLK1 signal obtained from the crystal oscillator 11, to be subjected to signal processing according to the aforementioned setting conditions, whereby MST-IDX1 and MST-IDX2 signals are created.

Based on the aforementioned setting conditions, the polygon driving CLK generating circuit 39Y allows the CLK1 signal to be subjected to signal processing, whereby the YP-CLK signal is generated. As described above, common use of the crystal oscillator 11 produces the MST-IDX1 and MST-IDX2 signals characterized by perfectly matched and fixed cycles, with respect to the cycle of the actually created YIDX signal.

The pseudo-index creating circuit 12 described above is connected with the CPU 55 and outputs the selection control signal SS1 to the polygon driving CLK generating circuit 39Y according to the sequence program. The selection control signal SS1 is set prior to the start of the face phase control of the polygon mirror 42Y. Similarly, the CPU 55 outputs the selection control signal SS2 to the Y-VV creating circuit 41Y according to the sequence program. The selection control signal SS2 is decoded from the control command for designating the rear face or tray switching, and is set before the rise of the image top signal (hereinafter referred to as "VTOP signal"). The VTOP signal is used to adjust the timing of the paper P conveyance and image formation.

The low level (hereinafter referred to as "L level") status of the aforementioned selection control signals SS1 and SS2 indicates that the front face or tray 1 is selected, for example. The high level (hereinafter referred to as "H level") status indicates that the rear face or tray 2 is selected. This arrangement allows the CPU 55 to control the YP-CLK signal frequency of the Y-color polygon motor 36 independently for each of other M, C and BK-color image forming sections 10M, 10C and 10K.

The image writing unit 3Y is composed of a crystal oscillator 31, an image CLK generating circuit 32, a horizontal synchronizing circuit 33, PWM signal generating circuit 34, a laser (LD) driving circuit 35, a polygon motor 36, a motor driving circuit 37, an index sensor 38, a polygon driving CLK generating circuit 39Y, a timing signal generator 40, and a Y-VV creating circuit 41Y, for example.

The crystal oscillator 31 oscillates the reference clock signal (hereinafter referred to as "CLK2 signal") and outputs it to the image CLK generating circuit 32. The crystal oscillator 31 can be connected with the image CLK generating circuit 32. Based on the frequency control signal Sg, the CLK generating circuit 32 generates the Y-color pixel clock signal (hereinafter referred to as "G-CLK signal"), and outputs it to the horizontal synchronizing circuit 33. The frequency control signal Sg is outputted to the image CLK generating circuit 32 from the CPU 55.

The image CLK generating circuit 32 is connected with the horizontal synchronizing circuit 33. It generates the horizontal sync signal Sh in response to the YIDX signal, and outputs it to the PWM signal generating circuit 34. The YIDX signal is outputted to the horizontal synchronizing circuit 33 from the Y-color index sensor 38. Further, it is outputted to the polygon driving CLK generating circuit 39Y. The index sensor 38 is composed of a light receiving device.

The horizontal synchronizing circuit 33 is connected with the PWM signal generating circuit 34. The horizontal sync signal Sh and Y-color image data Dy are inputted, and are outputted to the Y-color laser drive signal Sy after having been subjected to pulse width conversion. The Y-color laser drive signal Sy is outputted to the LD driving circuit 35. The aforementioned PWM signal generating circuit 34 is connected with the LD driving circuit 35. The LD driving circuit 35 is connected with a laser diode (not illustrated). The LD driving circuit 35 drives the laser diode in response to the laser drive signal Sy, and generates an Y-color light beam LY of predetermined intensity, which is radiated toward the polygon mirror 42Y.

The pseudo-index creating circuit 12 is connected with the Y-VV creating circuit 41Y, which is connected with the timing signal generator 40 to determine the time for starting Y-color image formation. The timing signal generator 40 is further connected with the CPU 55. For example, when an image is formed on the front face, an index selection signal (hereinafter referred to as "IND-SEL signal) and an counter output permission signal (image formation start signal; hereinafter referred to as "STT-Y signal") are generated, in response to the VTOP signal, the operation setting signal SC1, output control signal SC2 and selection control signal SS2 outputted from the CPU 55. These IND-SEL signals and STT-Y signals are then outputted to the Y-VV creating circuit 41Y.

In this example, the operation monitoring signal SM is outputted to the CPU 55 from the timing signal generator 40 so that the result of the operation in response to the operation setting signal SC1 will be notified. The CPU 55 monitors the Y-VV creating circuit 41Y in response to the operation monitoring signal SM.

The timing signal generator 40 is connected with the Y-VV creating circuit 41Y. The Y-VV creating circuit 41Y selects the MST-IDX1 or MST-IDX2 signal outputted from the pseudo-index creating circuit 12, and counts the pulses of the MST-IDX1 or MST-IDX2 signal. Based on the resulting pulse count, the MST-IDX1 or MST-IDX2 signal creates the Y-color image valid area signal in the sub-scanning direction (hereinafter referred to as "YVV signal") on the front and rear faces of the paper. The YVV signal is outputted to the Y-color image memory 83. The internal structure of the Y-VV creating circuit 41Y will be described with reference to FIG. 4.

The PWM signal generating circuit 34 is connected with the Y-color image memory 83. When an image is formed on the front and rear faces of the paper, Y-color image data Dy is read in response to the YVV signal. The R, G and B-color image data is read from the image memory 13 shown in FIG. 2, by the image processing section 16. The image data Dy is one of the Y, M, C and BK-color image data items obtained by color conversion of the R, G and B-color image data.

The crystal oscillator 11, pseudo-index creating circuit 12 and CPU 55 are connected with the polygon driving CLK generating circuit 39Y. The Y-color polygon drive clock signal (YP-CLK signal) is generated in response to the YIDX signal, CLK1 signal, MST-IDX1 signal, MST-IDX2 signal, speed setting signal Sv and selection control signal SS1.

When an image is formed on the front and rear faces, the speed setting signal Sv and selection control signal SS1 are outputted to the polygon driving CLK generating circuit 39Y from the CPU 55. The YIDX signal is outputted to the polygon driving CLK generating circuit 39Y from the index sensor 38. The CLK1 signal is outputted to the polygon driving CLK generating circuit 39 Y from the crystal oscillator 11. The MST-IDX1 and MST-IDX2 signals are outputted to the polygon driving CLK generating circuit 39Y from the pseudo-index creating circuit 12. The internal structure of the polygon driving CLK generating circuit 39Y will be described with reference to FIG. 5.

The polygon driving CLK generating circuit 39Y is connected with the motor driving circuit 37. The motor driving circuit 37 is connected to the polygon motor 36 and the polygon motor 36 is driven in response to the YP-CLK signal. The polygon motor 36 is equipped with a polygon mirror 42Y, which is driven in the main scanning direction by the driving force of the polygon motor 36.

The laser beam LY radiated from the diode (not illustrated) in the above-mentioned LD drive circuit 36 is applied in the main scanning direction when the polygon mirror 42Y is turned with respect to the photoconductor drum 1Y rotating in the sub-scanning direction. Then a electrostatic latent image is written to the photoconductor drum 1Y. The electrostatic latent image written to the photoconductor drum 1Y is developed by a Y-color toner member. The Y-color toner image on the photoconductor drum 1Y is transferred onto the intermediate transfer belt 6 that rotates in the sub-scanning direction (primary transfer).

The image writing units of other colors 3M, 3C and 3K have the same structure and functions, and will not be described to avoid duplication. In the above-mentioned description of this example, crystal oscillator 31, image CLK generating circuit 32, horizontal synchronizing circuit 33, PWM signal generating circuit 34, polygon driving CLK generating circuit 39Y, timing signal generator 40 and Y-VV creating circuit 41Y are included in the image writing unit 3Y. However, the present invention is not restricted to such a structure. For example, these circuits may be included in the image processing section 16 or control section 15.

In this example, the CPU 55 controls the frequency of the YP-CLK signal for each color in the order in which each step of completing the image formation on the front face of paper, so that the rotation speed of the polygon mirror 42Y or the like is changed. Then the CPU 55 provides phase control of the MST-IDX2 signal. This control procedure allows the change in the rotation speed and phase of the polygon mirror 42Y or the like to be controlled, upon termination of image formation of each color in response to the MST-IDX1 and MST-IDX2 signals set at a predetermined frequency. This provides agreement between the phase change control timing of the polygon mirror for this particular color and the rotation speed control timing of the polygon mirror for other colors, without having to wait for stabilization in the rotation speed of the polygon mirror 42K set to the reference color, and without having to wait for adjustment of the timing up to the start of image formation in all other colors.

Figure 4:
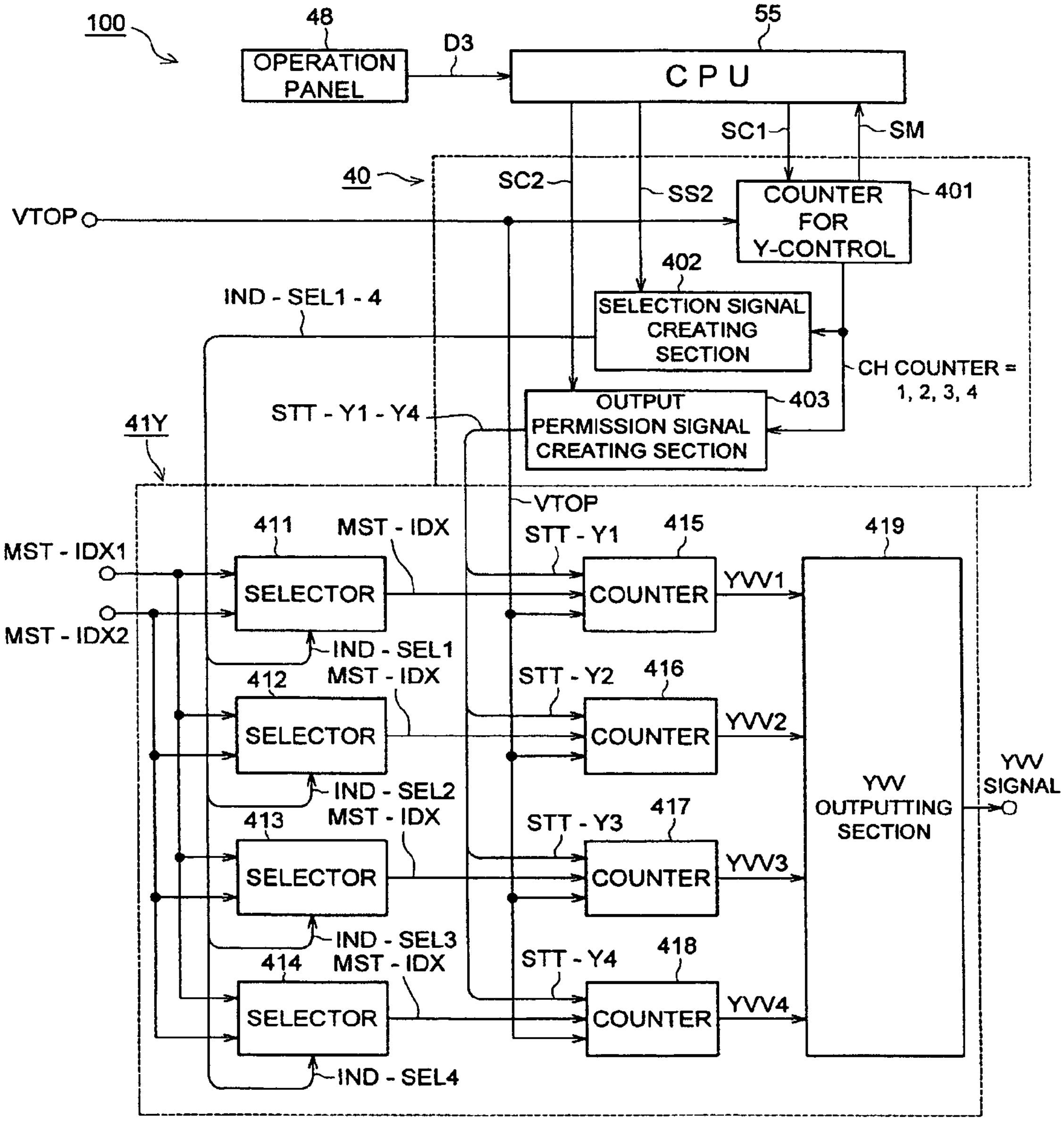
FIG. 4 is a diagram representing an example of the configuration of a Y-color timing signal generator 40, a Y-VV creating circuit 41Y and the peripheral circuit thereof.

FIG. 4 shows an example of the configuration of the Y-color timing signal generator 40, Y-VV creating circuit 41Y and peripheral circuits thereof. With reference to two or more image area setting counters, four (channel) counters 415 through 418 are provided for each color in the present embodiment. This example will be explained with reference to the Y-color Y-VV creating circuit 41Y.

The CPU 55 shown in FIG. 4 is connected with the timing signal generator 40. The timing signal generator 40 includes a counter for Y-control 401, a selection signal creating section 402 and an output permission signal creating section 403, for example.

In response to the operation setting signal SC1, the counter for Y-control 401 counts the output operations and controls the outputs of the four counters 415 through 418. The operation setting signal SC1 is outputted from the CPU 55 to the counter for Y-control 401. For example, the counter for Y-control 401 repeats the operation cyclically (in the form of a ring); the counter 415 as counter "1", the counter 416 as counter "2", the counter 417 as counter "3", the counter 418 as counter "4", and the counter 415 as counter "1". In this example, the count output value (CH counter=1, 2, 3 and 4) of the counter for Y-control 401 controls the setting of the counters 415 through 418 for setting the image valid area signal in the sub-scanning direction and the setting of the MST-IDX1 or MST-IDX2 signal.

The counter for Y-control 401 is connected with the selection signal creating section 402 and output permission signal creating section 403. The selection signal creating section 402 has a count source selection signal generating function. For example, in response to the selection control signal SS2 outputted from the CPU 55 and the count output value outputted from the counter for Y-control 401, an index selection signal (hereinafter referred to as "IND-SEL1 signal) is outputted to a selector 411. Similarly, the IND-SEL2 signal is outputted to a selector 412, and the IND-SEL3 signal to a selector 413, and the IND-SEL4 signal a selector 414, respectively.

The output permission signal creating section 403 has a counter enable signal generation function. For example, in response to the output control signal SC2 outputted from the CPU 55 and the counter output value outputted from the counter for Y-control 401, the counter output permission signal (hereinafter referred to as "STT-Y1 signal") is outputted to the counter 415. Similarly, the STT-Y2 signal is outputted to the counter 416, the STT-Y3 signal to the counter 417, and the STT-Y3 signal to the counter 418, respectively.

The selection signal creating section 402 and output permission signal creating section 403 are connected with the Y-VV creating circuit 41Y. The Y-VV creating circuit 41Y is composed of four selectors 411 through 414, four counters 415 through 418 and one YVV outputting section 419. The selectors 411 through 414 are connected to the pseudo-index creating circuit 12 shown in FIG. 3. In response to the index selection signal (hereinafter referred to as "IND-SEL1 signal"), the selector 411 selects the MST-IDX1 or MST-IDX2 signal and outputs it to the counter 415.

Similarly, in response to the IND-SEL2 signal, the selector 412 selects the MST-IDX1 or MST-IDX2 signal and outputs it to the counter 416. In response to the IND-SEL3 signal, the selector 413 selects the MST-IDX1 or MST-IDX2 signal and outputs it to the counter 417. In response to the IND-SEL4 signal, the selector 414 selects the MST-IDX1 or MST-IDX2 signal and outputs it to the counter 418.

The selector 411 is connected with the counter 415. Based on the VTOP signal it counts the pulses of the MST-IDX1 or MST-IDX2 signals and generates the YVV1 signal. The YVV1 signal is outputted according to the counter output permission signal (hereinafter referred to as "STT-Y1" signal). The selector 412 is connected with the counter 416. Based on the VTOP signal it counts the pulses of the MST-IDX1 or MST-IDX2 signals and generates the YVV2 signal. Similarly, the YVV2 signal is outputted according to the STT-Y2 signal.

The selector 413 is connected with the counter 417. Based on the VTOP signal it counts the pulses of the MST-IDX1 or MST-IDX2 signals and generates the YVV3 signal. Similarly, the YVV3 signal is outputted according to the STT-Y3 signal. The selector 414 is connected with the counter 418. Based on the VTOP signal it counts the pulses of the MST-IDX1 or MST-IDX2 signals and generates the YVV4 signal. Similarly, the YVV4 signal is outputted according to the STT-Y4 signal.

The four-bit counter, for example, is used as the above-mentioned four counters 415 through 418. The four counters 415 through 418 are connected with the YVV outputting section 419. In response to STT-Y1 through STT-Y4 signals, any one YVV signal out of the YVV1 through YVV4 signals, or YVV signals as an addition of all of the YVV1 through YVV4 signals are outputted to the image memory 83 or the like shown in FIG. 3. The YVV signal serves to set the starting position and width of the Y-color image formation area in the sub-scanning direction. A four-input logical sum (OR operation) circuit, for example, is used as the YVV outputting section 419.

The above-mentioned counter for Y-control 401, selection signal creating section 402 and output permission signal creating section 403 are connected to the CPU 55. In response to the preset image formation mode, it sets each of the outputs of the counters 415 through 418 independently, and selects and controls one of the counters 415 through 418 for each image formation for each color. The CPU 55, for example, outputs the operation setting signal SC1 to the counter for Y-control 401, the selection control signal SS2 to the selection signal creating section 402, and the output control signal SC2 to the output permission signal creating section 403, in such a way as to mask-control the resetting, start and stop of the counters 415 through 418, the start at a desired counter value, and a desired count value.

The CPU 55 provides output control of the counters 415 through 418, based on at least such factors as the thickness of the paper P, image formation on both sides of paper and magnification rate in image formation. In this example, such factors as the thickness of the paper P, image formation on both sides of paper and magnification rate in image formation are set on the CPU 55 as image formation mode using the operation panel 48. The operation settings in the image formation mode include selection of the type of paper P such as plain paper, recycled paper, coated paper and OHT paper, or selection of one of the sheet feed trays 20A through 20C. Further, image formation conditions such as image magnification rate or reduction rate are set from the operation panel 48. The image formation mode, image formation conditions and sheet feed tray selection information set from the operation panel 48 are outputted to the CPU 55 in the form of operation data D3.

The above-mentioned arrangement allows the MST-IDX1 or MST-IDX2 signal to be set independently by the counters 415 through 418 according to the image formation mode, and permits the output of the YVV1 signal, YVV2 signal, YVV3 signal or YVV4 signal to be reserved. This function allows the color tandem apparatus to output the YVV signals sequentially in the sub-scanning direction corresponding to the set value of each color.

The present example has been described with reference to the Y-color timing signal generator 40 and Y-VV creating circuit 41Y. The same arrangements are used for the timing signal generator 40 for other colors, M, C and BK colors, the M-VV creating circuit 41M, C-VV creating circuit 41C and K-VV creating circuit 41K. For example, the M-VV creating circuit 41M has four counters for generating the M-color MVV signal. Similarly, the C-VV creating circuit 41C has four counters for generating the C-color CVV signal. The K-VV creating circuit 41K has four counters for generating the BK-color KVV signal.

Each counter operates so as to set the start position and width of the image valid area in the sub-scanning direction, in response to the VTOP signal. In the manner as stated above, when the Y-VV creating circuit 41Y, M-VV creating circuit 41M, C-VV creating circuit 41C and K-VV creating circuit 41K have been formed, the start position and width of the image valid area in the sub-scanning direction corresponding to 16 counters can be set and reserved independently by each counter. This arrangement enables the color tandem apparatus to output the YVV, MVV, CVV and KVV signals sequentially in the sub-scanning direction corresponding to the set value of each color.

Figure 5:
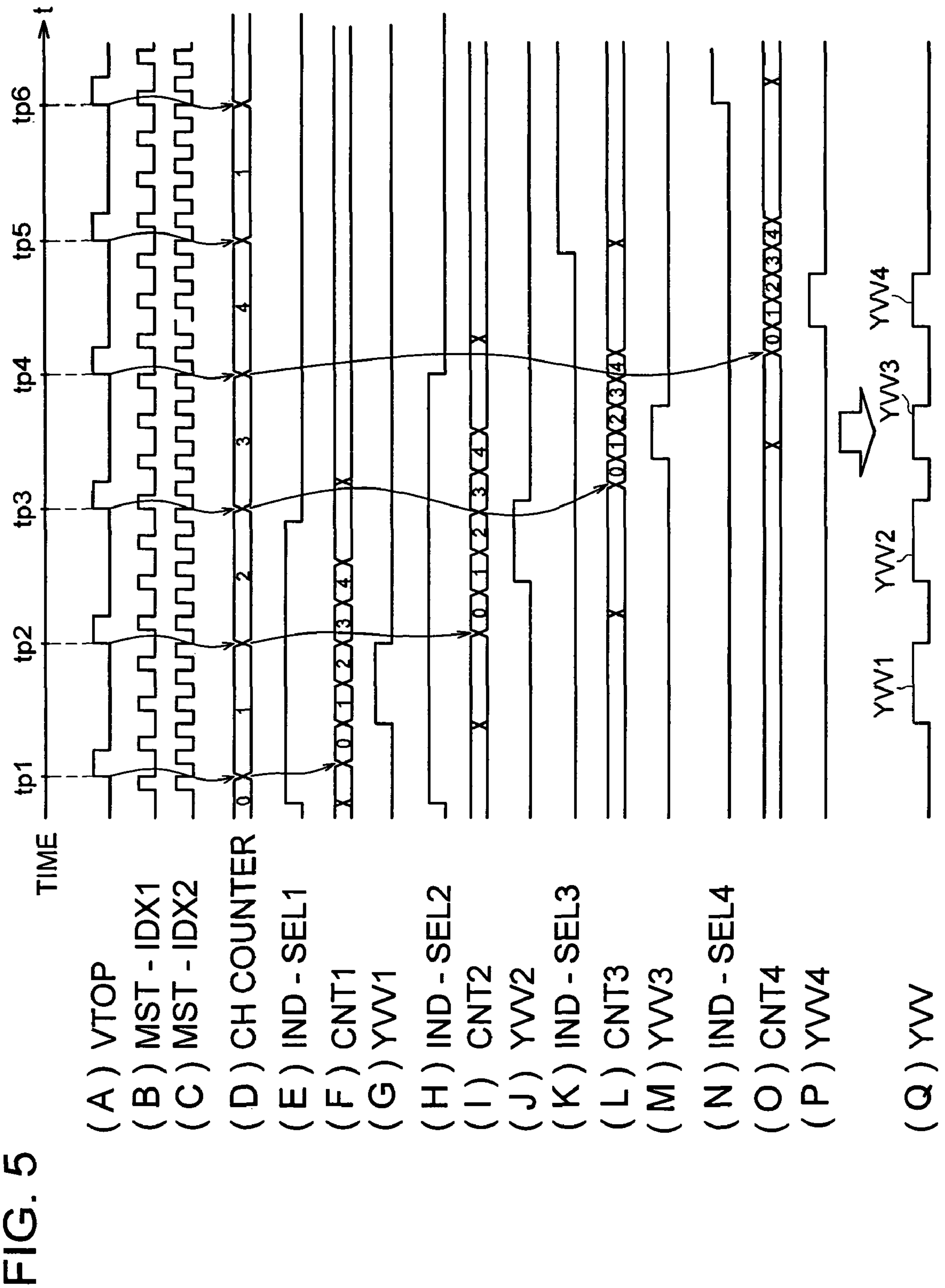
FIG. 5 is a time chart representing an example of the operations of the timing signal generator and Y-VV creating circuit.

FIG. 5((A) through (Q)) is a time charts representing an example of the operations of the timing signal generator and Y-VV creating circuit. In this example, all the output values of four counters 415 through 418 are added together. The selectors 411 and 412 select the MST-IDX1 signal, and the selectors 413 and 414 select the MST-IDX2 signal. Further, the following shows the example in the case where the IND-SEL1 and IND-SEL2 signals denote the output permission of the YVV1 and YVV2 signals on the "H" level, and the IND-SEL3 and IND-SEL4 signals denote the output permission of the YVV3 and YVV4 signals on the "L" level.

Cyclic operations of four counters 415 through 418 are performed under these operation conditions. When the first VTOP signal rises at time tp1 shown in (A) of FIG. 5, the counter for Y-control 401 counts the VTOP signal outputs (=1), in response to the operation setting signal SC1 (not illustrated), and outputs the CH counter shown in (D) of FIG. 5. The operation setting signal SC1 is outputted to the counter for Y-control 401 from the CPU 55. In this example, the counter for Y-control 401 counts the CH counter="1" shown in (D) of FIG. 5, and sets the CH counter="1" as the count output value to the selection signal creating section 402 and output permission signal creating section 403 so that the counter 415 will be set to counter "1".

In response to the signal SS2 outputted from the CPU 55 and the CH counter="1" outputted from the counter for Y-control 401, the selection signal creating section 402 outputs the IND-SEL1 signal on the "H" level shown in (E) of FIG. 5, to the selector 411. While the IND-SEL1 signal stays on the "H" level, the selector 411 selects the MST-IDX1 signal shown in (B) of FIG. 5 and outputs it to the counter 415.

In response to the STT-Y1 signal (not illustrated), the counter 415 counts the pulses of the MST-IDX1 signal. In the present example, while two pulses shown in (F) of FIG. 5 are counted, the YVV1 signal shown in (G) of FIG. 5 is outputted to the YVV outputting section 419. The YVV outputting section 419 outputs the YVV signal=YVV1 signal shown in (Q) of FIG. 5, to the image memory 83 or the like.

Further, when the second VTOP signal rises at time tp2 shown in FIG. 5 (A), the counter for Y-control 401 counts the VTOP signal outputs (=2), in response to the operation setting signal SC1 (not illustrated). The counter for Y-control 401 counts the CH counter="2" shown in (D) of FIG. 5, and sets the CH counter="2" as the count output value to the selection signal creating section 402 and output permission signal creating section 403 so that the counter 416 will be set to counter "2".

Based on the signal SS2 outputted from the CPU 55 and CH counter="2" outputted from the counter for Y-control 401, the selection signal creating section 402 outputs the IND-SEL2 signal on the "H" level shown in (H) of FIG. 5, to the selector 412. The selector 412 selects the MST-IDX1 signal shown in (B) of FIG. 5 while the IND-SEL2 signal stays on the "H" level, and outputs it to the counter 416.

In response to the STT-Y2 signal (not illustrated), the counter 416 counts the pulses of the MST-IDX1 signal. In the present example, while two pulses shown in (I) of FIG. 5 are counted, the YVV2 signal shown in (J) of FIG. 5 is outputted to the YVV outputting section 419. The YVV outputting section 419 outputs the YVV signal=YVV1+YVV2 signal shown in (Q) of FIG. 5, to the image memory 83 or the like.

Further, when the third VTOP signal rises at time tp3 shown in FIG. 5(A), the counter for Y-control 401 counts the VTOP signal outputs (=3), in response to the operation setting signal SC1 (not illustrated). The counter for Y-control 401 counts the CH counter="3" shown in (D) of FIG. 5, and sets the CH counter="3" as the count output value to the selection signal creating section 402 and output permission signal creating section 403 so that the counter 417 will be set to counter "3".

Based on the signal SS2 outputted from the CPU 55 and CH counter="3" outputted from the counter for Y-control 401, the selection signal creating section 402 outputs the IND-SEL3 signal shown in (K) of FIG. 5, to the selector 413. The selector 413 selects the MST-IDX2 signal shown in (C) of FIG. 5 while the IND-SEL3 signal stays on the "L" level, and outputs it to the counter 417.

In response to the STT-Y3 signal (not illustrated), the counter 417 counts the pulses of the MST-IDX2 signal. In the present example, while two pulses shown in (L) of FIG. 5 are counted, the YVV3 signal shown in (M) of FIG. 5 is outputted to the YVV outputting section 419. The YVV outputting section 419 outputs the YVV signal=YVV1+YVV2+YVV3 signal shown in (Q) of FIG. 5, to the image memory 83 or the like.

Further, when the fourth VTOP signal rises at time tp4 shown in (A) of FIG. 5, the counter for Y-control 401 counts the VTOP signal outputs (=4), in response to the operation setting signal SC1 (not illustrated). The counter for Y-control 401 counts the CH counter="4" shown in (D) of FIG. 5, and sets the CH counter="4" as the count output value to the selection signal creating section 402 and output permission signal creating section 403 so that the counter 418 will be set to counter "4".

Based on the signal SS2 outputted from the CPU 55 and CH counter="4" outputted from the counter for Y-control 401, the selection signal creating section 402 outputs the IND-SEL4 signal shown in (N) of FIG. 5, to the selector 414. The selector 414 selects the MST-IDX2 signal shown in (C) of FIG. 5 while the IND-SEL4 signal stays on the "L" level, and outputs it to the counter 418.

In response to the STT-Y4 signal (not illustrated), the counter 418 counts the pulses of the MST-IDX2 signal. In the present example, while two pulses shown in (O) of FIG. 5 are counted, the YVV4 signal shown in (P) of FIG. 5 is outputted to the YVV outputting section 419. The YVV outputting section 419 can output the YVV signal=YVV1+YVV2+YVV3+YVV4 signal shown in (Q) of FIG. 5, to the image memory 83 or the like.

Figure 6:
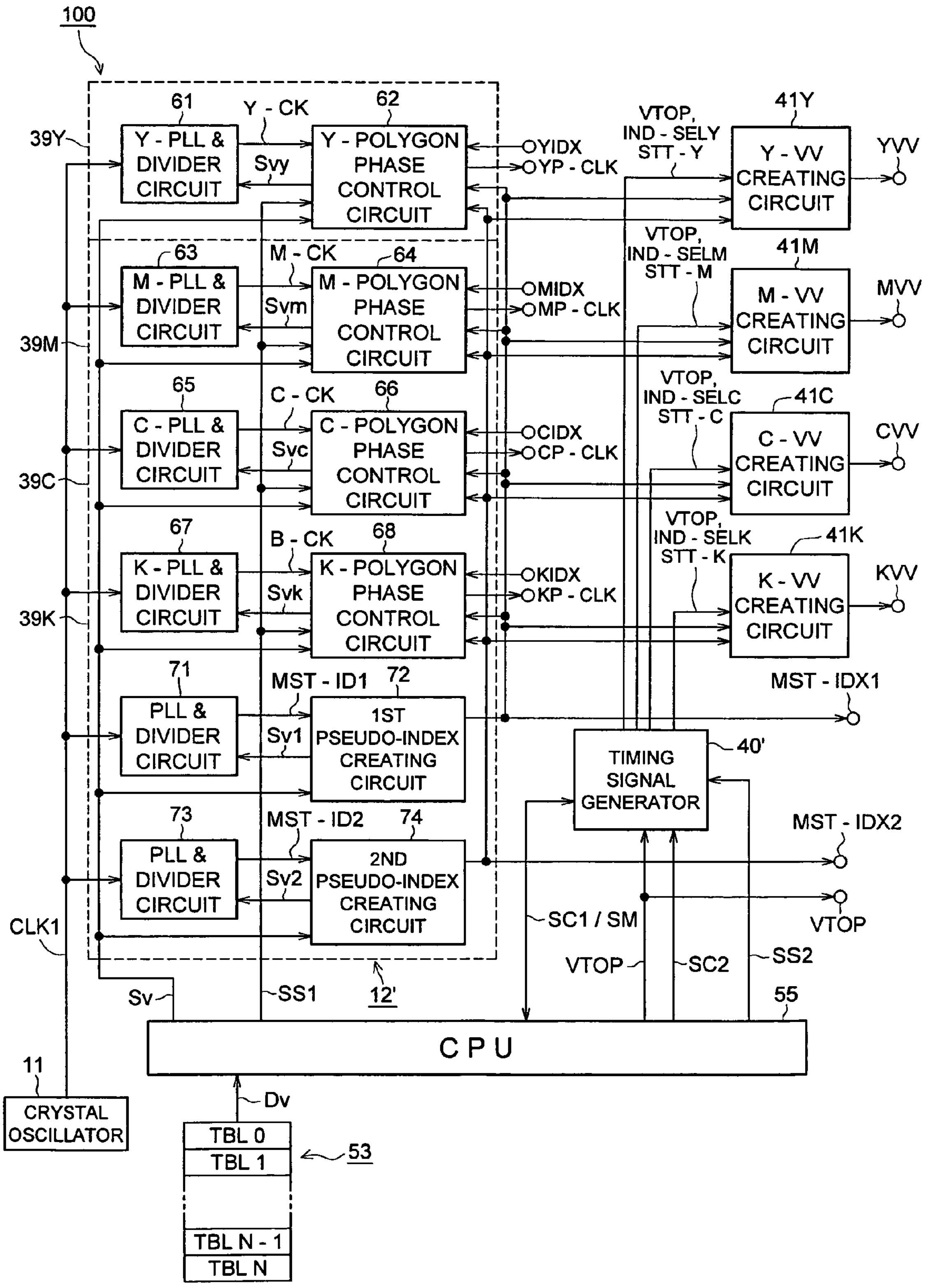
FIG. 6 is a block diagram representing the polygon driving CLK generating circuits in the image writing units for each color, and the peripheral circuits thereof.

FIG. 6 is a block diagram representing the polygon driving CLK generating circuits 39Y, 39M, 39C and 39K in the image writing units 3Y, 3M, 3C and 3K for each color and the peripheral circuits thereof.

The pseudo-index creating circuit 12, and polygon drive CLK generation circuits 39Y, 39M, 39C and 39K shown in FIG. 6 are connected to the CPU 55 as well as the crystal oscillator 11. The CPU 55 is connected with the Y-VV creating circuit 41Y, M-VV creating circuit 41M, C-VV creating circuit 41C and K-VV creating circuit 41K through a timing signal generator 40'. The pseudo-index creating circuit 12 is composed of a PLL & divider circuit 71, 1st pseudo-index creating circuit 72, PLL & divider circuit 73 and 2nd pseudo-index creating circuit 74.

Connected to the crystal oscillator 11, the PLL & divider circuit 71 divides the CLK1 signal outputted from the crystal oscillator 11, in response to the speed setting signal Sv1, and outputs the master divider clock signal (hereinafter referred to as "MST-ID1 signal") to the pseudo-index creating circuit 72. The pseudo-index creating circuit 72 is connected to the PLL & divider circuit 71 and CPU 55. Based on the speed setting signal Sv outputted from the CPU 55, it outputs the speed setting signal Sv1 for generating the MST-ID1 signal to the PLL & divider circuit 71, thereby providing the oscillation control. This oscillation control allows the pseudo-index creating circuit 72 to generate the MST-IDX1 signal of the primary cycle in response to the MST-ID1 signal.

Connected to the crystal oscillator 11, the PLL & divider circuit 73 divides the frequency of the CLK1 signal outputted from the crystal oscillator 11, in response to the speed setting signal Sv2, and outputs the master divider clock signal (hereinafter referred to as "MST-ID2 signal") to the pseudo-index creating circuit 74. The pseudo-index creating circuit 74 is connected to the PLL & divider circuit 73 and CPU 55. It outputs the speed setting signal Sv2 for generating the MST-ID2 signal based on the speed setting signal Sv outputted from the CPU 55, to the PLL & divider circuit 73, thereby providing the oscillation control. This oscillation control allows the pseudo-index creating circuit 74 to generate the MST-IDX2 of the secondary cycle signal in response to the MST-ID2 signal. These MST-IDX1 and MST-IDX2 signals are outputted to each of the Y-VV creating circuit 41Y, M-VV creating circuit 41M, C-VV creating circuit 41C and K-VV creating circuit 41K from the pseudo-index creating circuit 12.

The pseudo-index creating circuit 12 is connected with the polygon drive CLK generation circuit 39Y. The polygon drive CLK generation circuit 39Y is composed of the Y-PLL & divider circuit 61 and Y-polygon phase control circuit 62. In response to the speed setting signal Svy outputted from the Y-polygon phase control circuit 62, the Y-PLL & divider circuit 61 divides the frequency of the CLK1 signal outputted from the crystal oscillator 11, and outputs the divider clock signal (hereinafter referred to as "Y-CK signal") to the Y-polygon phase control circuit 62.

Connected to the CPU 55 and Y-PLL & divider circuit 61, the Y-polygon phase control circuit 62 outputs the speed setting signal Svy for generating the Y-CK signal based on the speed setting signal Sv and the selection control signal SS1 outputted from the CPU 55, to the Y-PLL & divider circuit 61, thereby providing the oscillation control. For example, when image formation on the front is switched over to image formation on the rear face, the CPU 55 refers to the speed shift data given in the N frequency dividing data tables in the ROM 53, and sends the speed setting signal Sv to the Y-polygon phase control circuit 62.

When the CPU 55 has determined that the image formation on the front face has been completed by the image writing unit 3Y, the polygon driving CLK frequency of the YP-CLK signal at the time of image formation on the front face, multiplied by the value reflecting the reduction ratio, for example, (L'/L)·(W/W') is set as the polygon driving CLK frequency of the YP-CLK signal at the time of image formation on the rear face. Then the speed setting signal (frequency control signal) Sv is outputted to the polygon drive CLK generation circuit 39Y. In this case, "L" denotes the length of paper P, and "W" the width. "L'" denotes the length of paper P after fixing, and "W'" the width thereof. In the paper P subsequent to fixing, length L shrinks to L' and width W to W'. The shrinkage of paper P is assumed to have been caused by evaporation of moisture at the time of fixing.

The Y-polygon phase control circuit 62 detects the phase difference based on the rising edge of the YIDX signal detected by the index sensor 38, and the rising edge of either the MST-IDX1 or MST-IDX2 signal selected by the selection control signal SS1. Phase control of the YP-CLK signal is provided based on this phase difference. This procedure allows, for example, the polygon drive CLK generation circuit 39Y to generate the YP-CLK signal for image formation on the rear face in response to the speed setting signal Sv outputted from the CPU 55. Then the YP-CLK signal with the frequency and phase having been adjusted is outputted to the polygon motor 36 in the image writing unit 3Y.

The Y-polygon phase control circuit 62 is connected with the Y-VV creating circuit 41Y. The VTOP signal, IND-SELY signal and STT-Y signal outputted from the timing signal generator 40', and the MST-IDX1 and MST-IDX2 signals outputted from the pseudo-index creating circuit 12 are inputted. In response to the operation setting signal SC1, output control signal SC2 and selection control signal SS2 outputted from the CPU 55, the timing signal generator 40' counts the VTOP signals and generates the Y-color counter output permission signal (STT-Y signal).

The Y-VV creating circuit 41Y selects the MST-IDX1 or MST-IDX2 signal in response to the IND-SELY signal, counts the pulses of the MST-IDX1 or MST-IDX2 signal in response to the VTOP signal, and generates the Y-color YVV signal in response to the STT-Y signal. The YVV signal is outputted to the LD driving circuit 35, motor driving circuit 37 and Y-color image memory 83 by the image writing unit 3Y shown in FIG. 2. The YVV signal is used as a control signal when reading out the image data Dy from the Y-color image memory 83 for example.

In the similar manner, the polygon drive CLK generation circuit 39M is composed of a M-PLL & divider circuit 63 and M-polygon phase control circuit 64. In response to the speed setting signal Svm outputted from the M-polygon phase control circuit 62, the M-PLL & divider circuit 63 divides the frequency of the CLK1 signal outputted from the crystal oscillator 11, and outputs the divider clock signal (hereinafter referred to as "M-CK signal") to the M-polygon phase control circuit 64.

The M-polygon phase control circuit 64 is connected with the M-VV creating circuit 41M. The VTOP signal, IND-SELM signal and STT-M signal outputted from the timing signal generator 40', and the MST-IDX1 and MST-IDX2 signals outputted from the pseudo-index creating circuit 12 are inputted. In response to the operation setting signal SC1, output control signal SC2 and selection control signal SS2 outputted from the CPU 55, the timing signal generator 40' counts the VTOP signals and generates the M-color counter output permission signal (STT-M signal).

The M-VV creating circuit 41M selects the MST-IDX1 or MST-IDX2 signal in response to the IND-SELM signal, counts the pulses of the MST-IDX1 or MST-IDX2 signal in response to the VTOP signal, and generates the M-color MVV signal in response to the STT-M signal. The MVV signal is outputted to the LD driving circuit, motor driving circuit and M-color image memory by the image writing unit 3M shown in FIG. 2. The MVV signal is used as a control signal when reading out the image data Dm from the M-color image memory, for example.

Further, the polygon drive CLK generation circuit 39C is composed of a C-PLL & divider circuit 65 and C-polygon phase control circuit 66. In response to the speed setting signal Svc outputted from the C-polygon phase control circuit 66, the C-PLL & divider circuit 65 divides the frequency of the CLK1 signal outputted from the crystal oscillator 11, and outputs the divider clock signal (hereinafter referred to as "C-CK signal") to the C-polygon phase control circuit 66.

The C-polygon phase control circuit 66 is connected with the C-VV creating circuit 41C. The VTOP signal, IND-SELC signal and STT-C signal outputted from the timing signal generator 40', and the MST-IDX1 and MST-IDX2 signals outputted from the pseudo-index creating circuit 12 are inputted. In response to the operation setting signal SC1, output control signal SC2 and selection control signal SS2 outputted from the CPU 55, the timing signal generator 40' counts the VTOP signals and generates the C-color counter output permission signal (STT-C signal).

The C-VV creating circuit 41C selects the MST-IDX1 or MST-IDX2 signal in response to the IND-SELC signal, counts the pulses of the MST-IDX1 or MST-IDX2 signal in response to the VTOP signal, and generates the C-color CVV signal in response to the STT-C signal. The CVV signal is outputted to the LD driving circuit, motor driving circuit and C-color image memory by the image writing unit 3C shown in FIG. 2. The CVV signal is used as a control signal when reading out the image data Dc from the C-color image memory, for example.

Further, the polygon drive CLK generation circuit 39K is composed of a K-PLL & divider circuit 67 and K-polygon phase control circuit 68. In response to the speed setting signal Svk outputted from the K-polygon phase control circuit 68, the K-PLL & divider circuit 67 divides the frequency of the CLK1 signal outputted from the crystal oscillator 11, and outputs the divider clock signal (hereinafter referred to as “K-CK signal”) to the K-polygon phase control circuit 68.

The K-polygon phase control circuit 68 is connected with the K-VV creating circuit 41K. The VTOP signal, IND-SELK signal and STT-K signal outputted from the timing signal generator 40', and the MST-IDX1 and MST-IDX2 signals outputted from the pseudo-index creating circuit 12 are inputted. In response to the operation setting signal SC1, output control signal SC2 and selection control signal SS2 outputted from the CPU 55, the timing signal generator 40' counts the VTOP signals and generates the BK-color counter output permission signal (STT-K signal).

The K-VV creating circuit 41K selects the MST-IDX1 or MST-IDX2 signal in response to the IND-SELK signal, counts the pulses of the MST-IDX1 or MST-IDX2 signal in response to the VTOP signal, and generates the BK-color KVV signal in response to the STT-K signal. The KVV signal is outputted to the LD driving circuit, motor driving circuit and BK-color image memory by the image writing unit 3K shown in FIG. 2. The KVV signal is used as a control signal when reading out the image data Dk from the K-color BK-color image memory, for example.

An example of the operation of the color copying machine 100 will be described.

Figure 7:
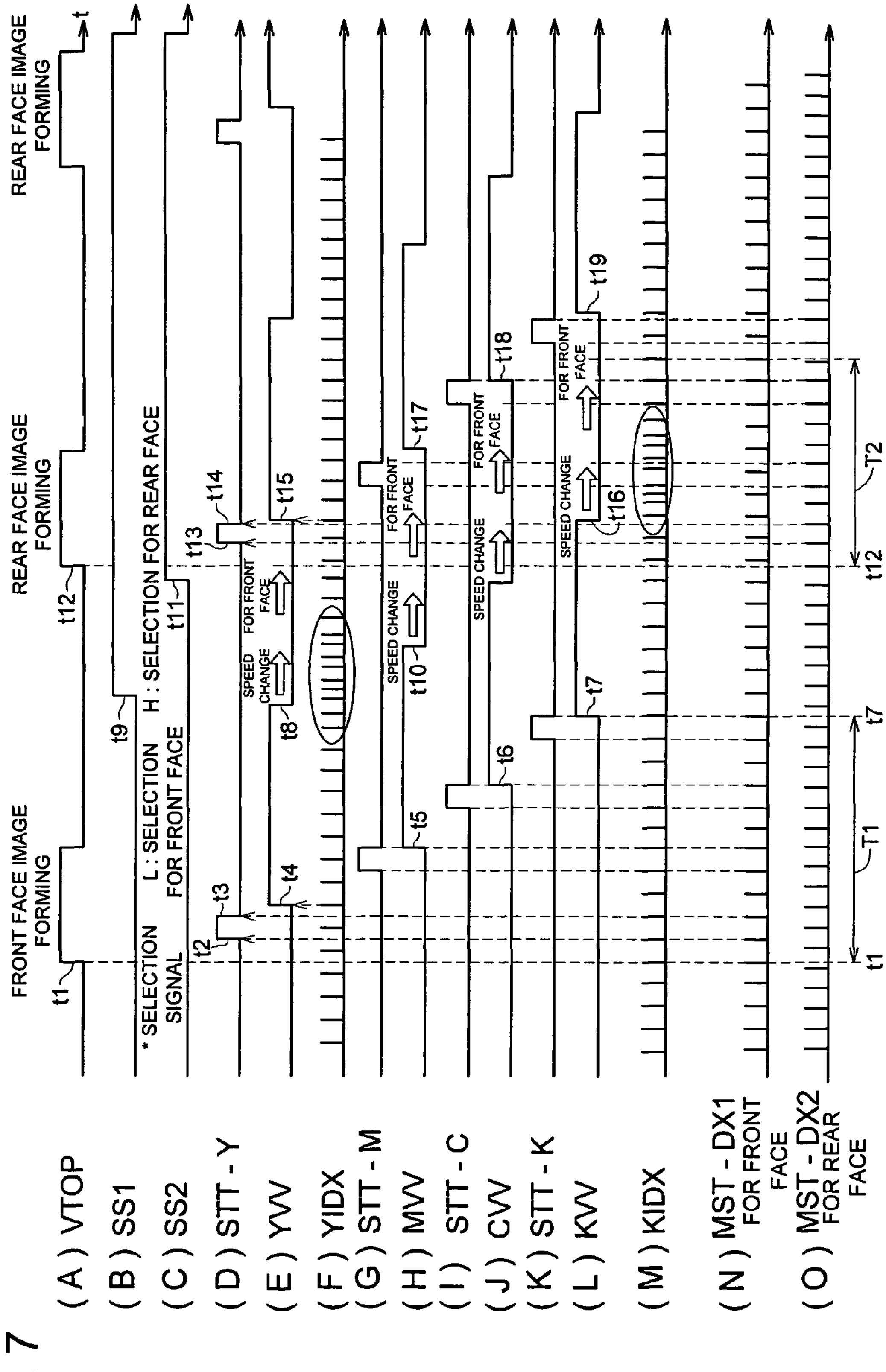
FIG. 7 is a time chart showing an example of the operation in the switching of the front/rear face image formation in a color copying machine 100.

FIG. 7((A) through (O)) is a time chart showing an example of the operation in the switching of the front/rear face image formation in the color copying machine 100.

In the switching of the front/rear face image formation according to the present embodiment, the image formation start timing on the rear face of the paper P is determined, based on the MST-IDX1 and MST-IDX2 signals, independently of the rotation speed control and face phase control of the polygon mirror 42Y of each color resulting from the cyclic variation of the YIDX signal, MIDX signal, CIDX signal and KIDX signal. At the same time, the processing of the next page formation is started in the BK-color image formation cycle, thereby setting the first Y-color image formation start timing on the rear face of paper.

The above-mentioned control procedure makes it possible to control the rotation speed change and face phase change of the polygon mirror 42Y or the like, based on the MST-IDX1 or MST-IDX2 signal preset to a predetermined cycle, upon completion of image formation in each color. This provides overlapping between the phase change control timing for the polygon mirror of this color and the rotation speed control timing of the polygon mirror of other colors, without having to wait for the stabilization of the rotation speed of the polygon mirror 42K preset as the reference color, and without having to wait for the adjustment of timing prior to start of image formation in all other colors.

In (N) of FIG. 7, the T1 denotes the time period of determining the timing for starting the YVV signal, MVV signal and CVV signal at the time of image formation on the front face, wherein the MST-IDX1 signal is used as a count source. The sub-scanning valid area (VV width) of each of the YVV signal, MVV signal and CVV signal at the time of image formation on the front face is set based on the operation setting signal SC1 outputted to the timing signal generator 40' from the CPU 55. The MST-IDX1 or MST-IDX2 signal is used, for example, alternately for the reference IDX signal at the time of the face phase control of the polygon mirror 42Y or the like.

Further, in the (O) of FIG. 7, T2 denotes the time period for determining the timing of starting the YVV signal, MVV signal and CVV signal at the time of image formation on the rear face, wherein the MST-IDX2 signal selected by the CPU 55 is used as a count source. It should be added that the VV width of each of the YVV signal, MVV signal and CVV signal at the time of image formation on the rear face is set, based on the operation setting signal SC1' outputted to the timing signal generator 40' from the CPU 55, similarly to the case of the front face.

In this example, the color toner image formed on the intermediate transfer belt 6 is fed in the sub-scanning direction in the order of BK, C, M, and Y colors. Accordingly, the image forming sections 10Y, 10M, 10C and 10K form the images in the order of Y, M, C and BK colors. Each of the image writing units 3Y, 3M, 3C and 3K controls the phase with reference to the simulated MST-IDX1 or MST-IDX2 signal.

The Y-color STT-Y signal (counter output permission signal) at the time of image formation on the front face is inputted in the Y-VV creating circuit 41Y of the writing unit 3Y, the above-mentioned Y-color STT-Y signal having been latched by the output permission signal creating section 403. The pulses of the MST-IDX1 or MST-IDX2 signal are counted based on the VTOP signal, thereby creating the YVV signal. This will be described below in three steps; image formation on the front face, switching between the front and rear faces and image formation on the rear face.

[Image Formation on the Front Face]

Based on the above-mentioned operation conditions, the VTOP signal (image top signal) indicating the image formation on the front face rises at time t1 in (A) of FIG. 7, synchronized with the MST-IDX1 signal shown in (N) of FIG. 7. Then the VTOP signal is sent, for example, from the image processing section 16 to the timing signal generator 40', Y-VV creating circuit 41Y, Y-VV creating circuit 41M, C-VV creating circuit 41C and K-VV creating circuit 41K.

In the timing signal generator 40' thereafter, the output permission signal creating section 403 allows the Y-color STT-Y signal in (D) of FIG. 7 to rise at time t2 synchronized with the MST-IDX1 signal shown in (N) of FIG. 7. This STT-Y signal is a counter output permission signal (image formation start signal) designating the image formation of yellow-color image forming section 10Y on the front surface. This STT-Y signal falls at time t3 shown in (D) of FIG. 7. The pulses of the MST-IDX1 signal is counted by the Y-VV creating circuit 41Y, in response to the VTOP signal and STT-Y signal. The Y-VV creating circuit 41Y causes the YVV signal to rise at time t4 indicated in (E) of FIG. 7.

In the Y-VV creating circuit 41Y, for example, the selector 411 selects the MST-IDX1 signal in response to the IND-SEL1 signal, and outputs it to the counter 415. The counter 415 counts the pulses of the MST-IDX1 signal based on the VTOP signal and generates the YVV1 signal. In response to the STT-Y1 signal, the YVV1 signal is outputted to the YVV outputting section 419. In response to STT-Y1 signal, the YVV outputting section 419 outputs the YVV1 signal as the YVV signal for Y-color image formation on the front face, to the image memory 83 or the like shown in FIG. 3.

The YVV signal shown in (E) of FIG. 7 is outputted to the Y-color image memory 83 or the like from the YVV outputting section 419. In this case, the horizontal synchronizing circuit 33 shown in FIG. 3 detects the horizontal sync signal Sh based on the YIDX signal, and outputs it to the PWM signal generating circuit 34. The YIDX signal shown in (F) of FIG. 7 is outputted to the horizontal synchronizing circuit 33 and the polygon drive CLK generation circuit 39Y from the Y-color index sensor 38.

The PWM signal generating circuit 34 reads the Y-color image data Dy from the horizontal sync signal Sh and image memory 83. This image data Dy is subjected to pulse width modulation and the Y-color laser drive signal Sy is outputted to the LD driving circuit 35. The LD driving circuit 35 drives the laser diode based on the laser drive signal Sy to generates the Y-color laser beam LY of a predetermined intensity, which is radiated toward the polygon mirror 42Y.

Further, the polygon drive CLK generation circuit 39Y generates the YP-CLK signal, based on the YIDX signal, CLK1 signal, MST-IDX1 signal, MST-IDX2 signal, speed setting signal Sv and "L" level selection control signal SS1. For example, in the polygon drive CLK generation circuit 39Y shown in FIG. 3, the Y-polygon phase control circuit 62 inputs the speed setting signal Sv outputted from the CPU 55 and "L" level selection control signal SS1. Oscillation control of the Y-PLL & divider circuit 61 is provided in response to the speed setting signal Sv and selection control signal SS1. Based on the speed setting signal Svy outputted from the Y-polygon phase control circuit 62, the Y-PLL & divider circuit 61 divides the frequency of the CLK1 signal outputted from the crystal oscillator 11 and outputs the Y-CK signal to the Y-polygon phase control circuit 62.

Based on the rising edge of the YIDX signal detected by the index sensor 38 and the rising edge of either the MST-IDX1 or MST-IDX2 signal (pseudo index signal) selected by the selection control signal SS1, the Y-polygon phase control circuit 62 detects the phase difference thereof, and provides the phase control of the YP-CLK signal based on this phase difference. The YP-CLK signal is the signal obtained by phase control of the Y-CK signal.

The motor driving circuit 37 drives the polygon motor 36 in response to the YP-CLK signal. The polygon motor 36 causes the polygon mirror 42Y to rotate. Laser beam LY is radiated by the laser diode connected to the laser driving circuit 35, and the laser beam LY is applied in the main scanning direction as the polygon mirror 42Y rotates in contrast to the photoconductor drum 1Y rotating in the sub-scanning direction. An electrostatic latent image is written to the photoconductor drum 1Y by this main scanning operation. The electrostatic latent image written to the photoconductor drum 1Y is developed by the Y-color toner member. The Y-color image on the photoconductor drum 1Y is transferred to the intermediate transfer belt 6 rotating in the sub-scanning direction (primary transfer).

The pulses of the MST-IDX1 signal are counted also during M-color image formation on the front face, and the MVV signal rises at time t5 shown in (H) of FIG. 7 after the rise of the M-color STT-M signal shown in (G) of FIG. 7, sequentially. In the M-VV creating circuit 41M, for example, the selector 412 (not illustrated) selects the MST-IDX1 signal based on the IND-SEL2 signal, and outputs it to the counter 416. The counter 416 counts the pulses of the MST-IDX1 signal based on the VTOP signal and generates the MVV2 signal. The MVV2 signal is outputted to the MVV output section (not illustrated) based on the STT-M2 signal. The MVV output section outputs the MVV2 signal as the MVV-signal for M-color image formation on the front face, to an image memory (not illustrated), based on the STT-M2 signal.

After the rise of the C-color STT-C signal, the CVV signal rises at time t6 shown in (J) of FIG. 7. In the C-VV creating circuit 41C, for example, the selector 413 (not illustrated) selects MST-IDX1 signal based on the IND-SEL3 signal, and outputs it to the counter 417. The counter 417 counts the pulses of the MST-IDX1 signal based on the image top signal VTOP and generates the CVV3 signal. The CVV3 signal is outputted to the CVV output section signal (not illustrated) based on the STT-C3 signal. The CVV output section outputs the CVV3 signal as the CVV signal for C-color image formation on the front face, to an image memory (not illustrated), based on the STT-C3 signal.

After the rise of the BK-color STT-K signal, the KVV signal rises at time t7 shown in (L) of FIG. 7. In the K-VV creating circuit 41K, for example, the selector 414 (not illustrated) selects MST-IDX1 signal based on the IND-SEL4 signal, and outputs it to the counter 418. The counter 418 counts the pulses of the MST-IDX1 signal based on the image top signal VTOP and generates the KVV4 signal. The KVV4 signal is outputted to the KVV output section signal (not illustrated) based on the STT-K4 signal. The KVV output section outputs the KVV4 signal as the KVV signal for the BK-color image formation on the front face, to the image memory (not illustrated), based on the STT-K4 signal.

[Switching Between the Front and Rear Faces]

In this example, the CPU 55 outputs the selection control signal SS1 according to the sequence program. For example, the KVV signal rises at time t7 and the fall of the YVV signal is detected at time t8. At t9 shown in (B) of FIG. 7, the selection control signal SS1 goes to the "H" level. The selection control signal SS1 on the "H" level, together with the frequency control signal Sg, is outputted to the polygon drive CLK generation circuits 39Y, 39M, 39C and 39K from the CPU 55.

Upon the fall of the YVV signal shown in (E) of FIG. 7 after completion of Y-color image formation at time t8 shown in (E) of FIG. 7, the image writing unit 3Y applies control of the rotation speed change and phase control change to the Y-color image formation on the rear face of paper, based on the YIDX signal shown in (F) of FIG. 7. The image CLK generating circuit 32 of the polygon drive CLK generation circuit 39Y, with the selection control signal SS1 and frequency control signal Sg inputted therein, generates a G-CLK signal (Y-color pixel CLK signal), based on the frequency control signal Sg, and outputs it to the horizontal synchronizing circuit 33. For example, the frequency of f0 the G-CLK signal at the time of image formation on the front face, multiplied by (L'/L)·(W/W') is set as the Y-color pixel CLK frequency f at the time of image formation.

The CPU 55 refers to the speed shift data given in the N frequency dividing data tables in the ROM 53, and sends the speed setting signal Sv to the Y-PLL & divider circuit 61. For example, when the CPU 55 has determined that the image formation on the front face has been completed by the image writing unit 3Y, the polygon driving CLK frequency of the YP-CLK signal at the time of image formation on the front face, multiplied by (L'/L)·(W/W') is set as the polygon driving CLK frequency of the YP-CLK signal at the time of image formation on the rear face. Then the speed setting signal (frequency control signal) Sv is outputted to the polygon drive CLK generation circuit 39Y. In the polygon drive CLK generation circuit 39Y, the YP-CLK signal for image formation on the rear face, for example, is generated according to the speed setting signal Sv outputted from the CPU 55. The YP-CLK signal with the frequency and phase adjusted is outputted to the polygon motor 36 inside the image writing unit 3Y.

Upon the fall of the MVV signal after completion of M-color image formation at time t10 shown in (H) of FIG. 7, the image writing unit 3M applies control of the rotation speed change and phase control change. The CPU 55 causes the selection control signal SS2 on the "L" level to rise to the "H" level according to the sequence program. The selection control signal SS2 on the "H" level is outputted to the timing signal generator 40' and the IND-SELY signal based on the selection control signal SS2 is outputted to the Y-VV creating circuit 41Y. In the similar manner, the IND-SELM signal is outputted to the M-VV creating circuit 41M, the IND-SELC signal is outputted to the C-VV creating circuit 41C, and the IND-SELK signal is outputted to the K-VV creating circuit 41K (see FIG. 6).

[Image Formation on the Rear Face]

In this example, the image processing section 16 causes the image top signal (VTOP) on the rear face to rise at the time of image formation on the rear face based on the MST-IDX2 signal. The timing signal generator 40' controls the Y-VV creating circuit 41Y, M-VV creating circuit 41M, C-VV creating circuit 41C, and K-VV creating circuit 41K, in response to the VTOP signal, and the operation setting signal SC1 and output control signal SC2 from the CPU 55. The Y-VV creating circuit 41Y, M-VV creating circuit 41M, C-VV creating circuit 41C and K-VV creating circuit 41K count the pulses of the MST-IDX2 signal in response to the VTOP signal, and generate the YVV, MVV, CVV and KVV signals for the rear face, based on the pulse count.

The image processing section 16 allows the VTOP signal indicating the image formation on the rear face to rise at time t12 in (A) of FIG. 7, synchronized with the MST-IDX2 signal shown in (O) of FIG. 7. Then the image top signal VTOP is sent from the image processing section 16 to the timing signal generator 40', Y-VV creating circuit 41Y, M-VV creating circuit 41M, C-VV creating circuit 41C and K-VV creating circuit 41K.

In the timing signal generator 40', the output permission signal creating section 403 allows the Y-color STT-Y signal in (D) of FIG. 7 to rise at time t13, synchronized with the MST-IDX2 signal shown in (N) of FIG. 7. This STT-Y signal is a counter output permission signal (image formation start signal) designating the image formation on the rear surface. This STT-Y signal falls at time t14 shown in (D) of FIG. 7. The pulses of the MST-IDX2 signal are counted by the Y-VV creating circuit 41Y, in response to the image top signal VTOP and STT-Y signal. The Y-VV creating circuit 41Y causes the YVV-signal to rise at time t15 indicated in (E) of FIG. 7.

In the Y-VV creating circuit 41Y, for example, the selector 413 selects the MST-IDX2 signal in response to the IND-SEL3 signal, and outputs it to the counter 417. The counter 417 counts the pulses of the MST-IDX2 signal based on the image top signal VTOP and generates the YVV3 signal. In response to the STT-Y3 signal, the YVV3 signal is outputted to the YVV outputting section 419. In response to STT-Y3 signal, the YVV outputting section 419 outputs the YVV3 signal as the YVV signal for Y-color image formation on the rear face, to the image memory 83 and others shown in FIG. 3. Upon fall of the KVV signal shown in (L) of FIG. 7 at time t16, the image writing unit 3K controls the rotation speed and phase of the polygon mirror 42K in response to the KIDX signal shown in (M) of FIG. 7.

The pulses of the MST-IDX2 signal are counted also during Y-color image formation on the rear face, and the MVV signal rises at time t17 shown in (H) of FIG. 7 after the rise of the M-color STT-M signal shown in (G) of FIG. 7, sequentially. In the M-VV creating circuit 41M, for example, the selector 414 (not illustrated) selects MST-IDX2 signal based on the IND-SEL4 signal, and outputs it to the counter 418. The counter 418 counts the pulses of the MST-IDX2 signal based on the image top signal VTOP and generates the MVV4 signal. The MVV4 signal is outputted to the MVV output section signal (not illustrated) based on the STT-M4 signal. The MVV output section outputs the MVV4 signal as the MVV-signal for M-color image formation on the rear face, to the image memory (not illustrated), based on the STT-M4 signal.

After the rise of the C-color STT-C signal shown in (I) of FIG. 7, the CVV signal rises at time t18 shown in (J) of FIG. 7. In the C-VV creating circuit 41C, for example, the selector 411 (not illustrated) selects MST-IDX2 signal based on the IND-SEL1 signal, and outputs it to the counter 415. The counter 415 counts the pulses of the MST-IDX2 signal based on the image top signal VTOP and generates the CVV1 signal. The CVV1 signal is outputted to the CVV output section signal (not illustrated) based on the STT-C1 signal. The CVV output section outputs the CVV1 signal as the CVV signal for C-color image formation on the rear face, to an image memory (not illustrated), based on the STT-C1 signal.

After the rise of the BK-color STT-K signal, the KVV signal rises at time t19 shown in (L) of FIG. 7. In the K-VV creating circuit 41K, for example, the selector 412 (not illustrated) selects MST-IDX2 signal based on the IND-SEL2 signal, and outputs it to the counter 416. The counter 416 counts the pulses of the MST-IDX2 signal based on the image top signal VTOP and generates the KVV2 signal. The KVV2 signal is outputted to the KVV output section signal (not illustrated) based on the STT-K2 signal. The KVV output section outputs the KVV4 signal as the KVV signal for the BK-color image formation on the rear face, to an image memory (not illustrated), based on the STT-K2 signal. This procedure allows the YVV, MVV, CVV and KVV signals corresponding to the set values of the respective color in the sub-scanning direction to be outputted sequence in the color copying machine 100.

As described above, in the color copying machine 100 as the present embodiment, the Y-VV creating circuit 41Y, M-VV creating circuit 41M, C-VV creating circuit 41C and K-VV creating circuit 41K each have counters 415 through 418. Based on this arrangement, for example, the Y-VV creating circuit 41Y generates the YVV1, YVV2, YVV3 and YVV4 signals for setting the start position and width of the image formation area in the sub-scanning direction.

The CPU 55 controls the color image formation on a predetermined side of paper based on:

the VTOP signal for controlling the image writing to the photoconductor drum 1Y;

the Y-color YVV signal created by the Y-VV creating circuit 41Y; and the MST-IDX1 or MST-IDX2 signal for rotation speed control and face phase control of the polygon mirror 42Y.

This color image formation control allows the polygon mirror 42Y to apply the optical beam based on the image data of the present job, to the photoconductor drum 1Y. The CPU 55 independently sets the outputs of the counters 415 through 418 for image area setting, based on the preset image formation mode through the counter for Y-control 401, selection signal creating section 402 and output permission signal creating section 403. At the same time, the CPU 55 selects one of the counters 415 through 418 for each image formation operation, and controls it.

This permits a cyclic use of the counters 415 through 418 of each of the Y-VV creating circuit 41Y, M-VV creating circuit 41M, C-VV creating circuit 41C and K-VV creating circuit 41K. Accordingly, the pulses of the MST-IDX1 or MST-IDX2 signal can be counted for each color, using unoccupied counters 415, 416, 417 and 418 sequentially. This arrangement allows the YVV, MVV, CVV and KVV signals to be set for each color, prior to the rise of the VTOP signal for controlling the image writing in the next job.

For example, when the CPU 55 controls color image formation on the front and rear faces of paper, the IND-SEL1 signal is outputted to the selector 41 in such a way that the first counter 415 for generating the YVV1 signal based on the MST-IDX1 signal (count trigger for the front face) and the second counter 416 for generating the YVV2 signal based on the MST-IDX2 signal (count trigger for the rear face) will be selected by the Y-VV creating circuit 41Y. At the same time, the IND-SEL2 signal is outputted to the selector 412. The outputs of the counters 415 and 416 are controlled independently for each VTOP signal in such a way that, when the image forming section 60 provides color image formation on the front face of paper, the MST-IDX1 signal is selected for the VTOP signal and the Y-VV1 signal is generated; and, when the image forming section 60 provides color image formation on the rear face of paper, the MST-IDX2 signal is selected for the VTOP signal and the Y-VV2 signal is generated.

This arrangement allows preparation for the next job to be started during execution of the previous job. In the duplex image formation mode, the page formation on the rear face can be started, without having to wait for the completion of page formation on the front face, and continuous high-speed operation for the front and rear faces (change of magnification rate by switching of linear speed) can be performed. This arrangement ensures simplification and load reduction in software control, and improves productivity in copying operation, thereby contributing greatly to high speed processing in color image formation.

As described above, the present invention provides a tandem type color image forming apparatus wherein a signal creating section has two or more image range setting counters for each color. Based on this arrangement, the signal creating section generates an image valid area signal for setting the start position and width of an image forming area in the sub-scanning direction. The control section controls color image formation on a predetermined face of paper, based on an image top signal for controlling the writing of an image to an image carrier, and an image valid area signal for each color created by the signal creating section. The control section independently sets the output of the image area setting counter, based on the preset image formation mode. At the same time, this control section selects one of the image area setting counters for each operation of image formation in each color, and controls it.

For example, when the control section controls color image formation on the front and rear faces of paper, the signal creating section selects the first counter for generating the image valid area signal in response to the count trigger for the front face, and the second counter for generating the image valid area signal in response to the count trigger for the rear face. The outputs of the first and second counters are controlled independently for each VTOP signal in such a way that, when a color image is formed on the front face of paper, the count trigger for front face is selected for the image top signal and the image valid area signal is generated; and, when a color image is formed on the rear face of paper, the count trigger for rear face is selected for the image top signal and the image valid area signal is generated.

This permits a cyclic use of the image area setting counters. Accordingly, the pulses of the main scanning reference signal can be counted for each color, using unoccupied counters sequentially. This arrangement allows the image valid area signal to be set for each color, prior to the rise of the image top signal for controlling the image writing in the next job. This allows page formation for rear face to be started, without having to wait for the completion of page formation on the front face, and continuous operation (change of magnification rate) for the front and rear faces can be performed.

The color image forming apparatus of the embodiment explained above includes a control section for controlling the color image formation on a predetermined face of paper, in response to the image top signal, image valid area signal for each color and main scanning reference signal. This control section independently sets the outputs of the image area setting counters, based on a predetermined image formation mode, and selects one of the image area setting counters for each operation of image formation in each color, thereby controlling the selected one.

This arrangement permits a cyclic use of these counters. Accordingly, the pulses of the main scanning reference signal can be counted for each color, using unoccupied counters sequentially. This arrangement allows the image valid area signal to be set for each color, prior to the rise of the image top signal for controlling the image writing in the next job, and ensures simplification and load reduction in software control. This arrangement also allows preparation for the next job to be started during execution of the previous job, and therefore, improves productivity in copying operation in the duplex image formation mode, thereby contributing greatly to high speed processing in color image formation.

The present invention is most preferably applied to a tandem type color printer or a copying machine provided with an intermediate transfer belt and a plurality of photoconductor drums, or to a combination machine thereof.

What is claimed is:

1. A tandem type color image forming apparatus, which continuously forms color images on both faces of a recording sheet, each of the color images containing two or more colors, the color image forming apparatus comprising:

a pseudo index creating circuit which creates a plurality of pseudo index signals each having a prescribed cycle period;

a plurality of signal creating sections each of which being provided for each color, wherein a signal creating section for each color comprises:

two or more image area setting counters, exclusively provided to the signal creating section for each color and configured to be activated in parallel with each other, for generating an image valid area signal to set a starting position and a width of an image formation area in a sub-scanning direction; and two or more selectors exclusively provided to the signal creating section for each color, each of the selectors corresponding to each of the two or more image area setting counters and configured to select one of the plurality of pseudo index signals in parallel with each other for scanning in a main scanning direction; and a control section for executing color image formation control on a front face and a rear face of the recording sheet, based on an image top signal for controlling writing of an image on an image carrier and the image valid area signal for each color created by the signal creating section, wherein the control section is configured to control the signal creating section for each color in such a way:

in a case of image formation for each color on the front face of the recording sheet, to sequentially select a first counter out of the two or more image area setting counters to output signals for a front face image formation, to select a first pseudo index signal for the front face image formation out of the plurality of pseudo index signals by a selector corresponding to the first counter, and to create the image valid area signal for the front image formation by activating the first counter; and in a case of image formation for each color on the rear face of the recording sheet, to sequentially select a second counter out of the two or more image area setting counters to output signals for a rear face image formation, to select a second pseudo index signal for the rear face image formation out of the plurality of pseudo index signals by another selector of the two or more selectors corresponding to the second counter, and to create the image valid area signal for the rear image formation by activating the second counter, wherein the control section controls the image formation for each color based on the created image valid area signal.

2. The color image forming apparatus of claim 1, further comprising a main scanning unit for each color which repeatedly scans a light beam in the main scanning direction, wherein, when switching between the front face image formation and the rear face image formation, the control section controls a scanning speed and a scanning phase of the main scanning unit according to a thickness of the recording sheet and/or a magnification rate of the image formation.

3. The color image forming apparatus of claim 1, wherein each of the selectors selects one of two or more types of pseudo index signals each having a fixed cycle, based on a selection control signal outputted from the control section; and each of the two or more counters generates the image valid area signal by counting a pulse number of the one of two or more types of pseudo index signals selected by each of the selectors, based on the image top signal, wherein the control section executes output control of the two or more counters according to whether the image formation is on the front face or on the rear face of the recording sheet.

4. The color image forming apparatus of claim 1, wherein the signal creating section comprises:

two or more yellow counters for generating the image valid area signal for yellow color;

two or more magenta counters for generating the image valid area signal for magenta color;

two or more cyan counters for generating the image valid area signal for cyan color; and two or more black counters for generating the image valid area signal for black color, wherein said two or more counters of each color are provided exclusively to each color, wherein each counter of the yellow counters, the magenta counters, cyan counters and the black counters sets the starting position and width of the image valid area in the sub-scanning direction, based on the image top signal.

5. The color image forming apparatus of claim 1, further comprising a control counter for counting a number of output times of the image top signal.

* * * * *